US012580000B2

(12) United States Patent
Kutas et al.

(10) Patent No.: US 12,580,000 B2
(45) Date of Patent: Mar. 17, 2026

(54) MULTITRACK EFFECT VISUALIZATION AND INTERACTION FOR TEXT-BASED VIDEO EDITING

(71) Applicant: Adobe Inc., San Jose, CA (US)

(72) Inventors: David Tamas Kutas, Irvine, CA (US); Lubomira Assenova Dontcheva, Seattle, WA (US); Kim Pascal Pimmel, Seattle, WA (US); Hijung Shin, Arlington, MA (US)

(73) Assignee: Adobe Inc., San Jose, CA (US)

( * ) Notice: Subject to any disclaimer, the term of this patent is extended or adjusted under 35 U.S.C. 154(b) by 117 days.

(21) Appl. No.: 18/152,328

(22) Filed: Jan. 10, 2023

(65) Prior Publication Data

US 2024/0233769 A1 Jul. 11, 2024

(51) Int. Cl.
*G11B 27/031* (2006.01)
*G06F 3/04842* (2022.01)
*G11B 27/34* (2006.01)

(52) U.S. Cl.
CPC ........ *G11B 27/031* (2013.01); *G06F 3/04842* (2013.01); *G11B 27/34* (2013.01)

(58) Field of Classification Search
CPC .......... G11B 27/031–038; G11B 27/34; G11B 27/02–06; G06F 3/048; G06F 3/04842; G06Q 10/10
See application file for complete search history.

(56) References Cited

U.S. PATENT DOCUMENTS

| | | | |
|---|---|---|---|
| 2014/0169767 A1* | 6/2014 | Goldberg | G06Q 10/10 |
| | | | 386/282 |
| 2015/0039991 A1* | 2/2015 | Cameron | G11B 27/34 |
| | | | 715/230 |
| 2017/0169840 A1* | 6/2017 | Rubin | G10L 15/26 |
| 2020/0126583 A1* | 4/2020 | Pokharel | G10L 15/1822 |

(Continued)

OTHER PUBLICATIONS

Descript. "Descript Storyboard: Preview & Demo." Youtube. Jul. 13, 2022. <https://www.youtube.com/watch?v=P7SfbmsEK24> (Year: 2022).*

(Continued)

*Primary Examiner* — Liang Y Li
(74) *Attorney, Agent, or Firm* — Shook, Hardy & Bacon L.L.P.

(57) ABSTRACT

Embodiments of the present disclosure provide systems, methods, and computer storage media providing visualizations and mechanisms utilized when performing video edits using wrapped timelines (e.g., effect bars/effect tracks) interspersed between text lines representing video effects being applied to text segments in a transcript. An example embodiment provides a transcript using an audio track from a transcribed video. A transcript interface presents the transcript and accepts an input selecting sentences or words from the transcript. The identified boundaries corresponding to the selected text segment are used as boundaries for a selected video segment. Using the selected text segment, a user selects a video effect in which to apply to the corresponding video segment and within the transcript interface, a wrapped timeline is placed in the transcript along the selected text segment to indicate that the video effect is applied to the corresponding video segment.

20 Claims, 13 Drawing Sheets

(56) References Cited

U.S. PATENT DOCUMENTS

| | | | |
|---|---|---|---|
| 2022/0130427 A1* | 4/2022 | Allibhai | G10L 21/10 |
| 2023/0027035 A1* | 1/2023 | Gagliano | G11B 27/031 |
| 2023/0420001 A1* | 12/2023 | Washington | G06F 16/7867 |
| 2024/0013158 A1* | 1/2024 | Zahavi | G06F 3/0482 |
| 2024/0212715 A1* | 6/2024 | Yee | G11B 27/34 |

OTHER PUBLICATIONS

Simmons, Scott. "Review: Reduct.video" Provideocoalition.com. Oct. 31, 2022. <https://www.provideocoalition.com/review-reduct-video-a-cloud-and-ai-based-system-to-transcribe-organize-correct-and-edit-video-fr (Year: 2022).*

* cited by examiner

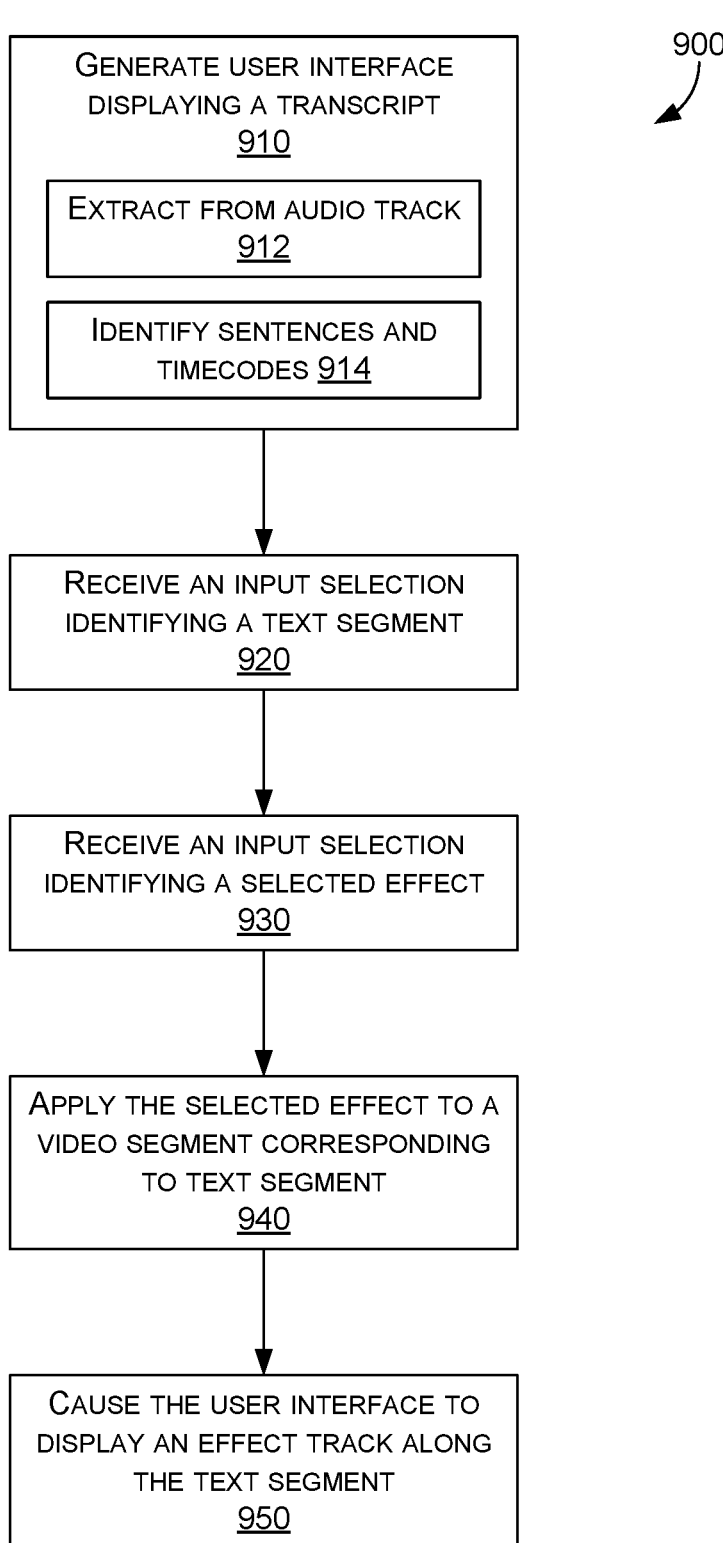

900

GENERATE USER INTERFACE
DISPLAYING A TRANSCRIPT
910

EXTRACT FROM AUDIO TRACK
912

IDENTIFY SENTENCES AND
TIMECODES 914

RECEIVE AN INPUT SELECTION
IDENTIFYING A TEXT SEGMENT
920

RECEIVE AN INPUT SELECTION
IDENTIFYING A SELECTED EFFECT
930

APPLY THE SELECTED EFFECT TO A
VIDEO SEGMENT CORRESPONDING
TO TEXT SEGMENT
940

CAUSE THE USER INTERFACE TO
DISPLAY AN EFFECT TRACK ALONG
THE TEXT SEGMENT
950

GENERATE USER INTERFACE
DISPLAYING A TRANSCRIPT
1010

RECEIVE AN INPUT SELECTION
IDENTIFYING A TEXT LINE
1020

CAUSE THE USER INTERFACE TO
DEEMPHASIZE THE OTHER TEXT LINES
1030

CAUSE THE USER INTERFACE TO
DISPLAY AN EXPANDED VISUALIZATION
OF WRAPPED TIMELINES
1040

1100

GENERATE USER INTERFACE DISPLAYING
A TRANSCRIPT
1110

RECEIVE AN INPUT SELECTION OF AN
ADJUSTABLE HANDLE OF A HIGHLIGHTED
TEXT SEGMENT
1120

CAUSE THE USER INTERFACE TO DISPLAY
A VIEWING LENS
1130

CAUSE THE USER INTERFACE TO DISPLAY
AN EXPANDED VISUAL REPRESENTATION
OF THE TRANSCRIPT
1140

MULTITRACK EFFECT VISUALIZATION AND INTERACTION FOR TEXT-BASED VIDEO EDITING

BACKGROUND

Recent years have seen a proliferation in the use of video, which has applications in practically every industry, from film and television to advertising and social media. Businesses and individuals routinely create and share video content in a variety of contexts, such as presentations, tutorials, commentary, news and sports segments, blogs, product reviews, testimonials, comedy, dance, music, movies, and video games, to name a few examples. Video can be captured using a camera, generated using animation or rendering tools, edited with various types of video editing software, and shared through a variety of outlets. Indeed, recent advancements in digital cameras, smartphones, social media, and other technologies have provided a number of new ways that make it easier for even novices to capture and share a video. With these new ways to capture and share videos comes an increasing demand for video editing features.

Conventionally, video editing involves selecting video frames and performing some action on the frames or associated audio. Some common operations include importing, trimming, cropping, rearranging, applying transitions and effects, adjusting the color, adding titles and graphics, exporting, and others. Video editing software, such as ADOBE® PREMIERE® PRO and ADOBE PREMIERE ELEMENTS, typically includes a graphical user interface ("GUI") that presents a video timeline that represents the video frames in the video and allows the user to select particular frames and the operations to perform on the frames.

SUMMARY

Embodiments of the present disclosure are directed to providing visualizations and mechanisms that are utilized when performing video edits using transcript interactions, including wrapped timelines (e.g., effect bars/effect tracks) interspersed between text lines of a transcript that represent video effects being applied to video segments corresponding to text segments of the transcript. Additional wrapped timelines, icons, and labels in the transcript provide visualizations of the effects being applied to a corresponding video. An example embodiment provides a transcript using an audio track from a transcribed video. The transcript identifies sentences, words, and timestamps representing when in the video each word is spoken. A transcript interface presents the transcript and accepts an input selecting sentences or words from the transcript. For example, a user clicks and drags across the transcript to select a text segment. The identified boundaries corresponding to the selected text segment are used as boundaries for a selected video segment. Using the selected text segment, a user selects a video effect (e.g., visual effect, audio effect, invisible effect) to apply to the video segment corresponding to the selected text segment. Within the transcript interface, a wrapped timeline is placed in the transcript along the selected text segment to indicate that the video effect is applied to the corresponding video segment. In some embodiments, the transcript interface presents multiple wrapped timelines along a text segment to differentiate, in the transcript, different video effects being applied to a corresponding video segment.

Additional embodiments of the present disclosure are directed to providing an enhanced visualization and refined mechanics for a focused view when performing video edits using transcript interactions when wrapped timelines are applied to text segments in a transcript. In an example embodiment, the transcript interface displays a transcript including a composite wrapped timeline applied to a text segment of a transcript. The composite wrapped timeline corresponds to multiple video effects. When the composite wrapped timeline or the corresponding text segment is selected, the corresponding text segment is highlighted, and the composite wrapped timeline relating to the text segment is expanded to display a wrapped timeline for each of the video effects. When expanded, the wrapped timelines are vertically stacked. In some embodiments, the wrapped timelines are grouped by effect type. For instance, in some configurations, wrapped timelines for audio effects are placed above the text segment and wrapped timelines for visual effects are placed below the text segment. Additionally, in some embodiments, each wrapped timeline includes an icon and/or a label relating to the effect type the wrapped timeline represents respectively. The transcript can also deemphasize (e.g., fadeout, blur, mask, hide) the surrounding text lines providing a focused visualization of the selected text segment and all effects relating to that text segment. In some embodiments, upon selecting an expanded wrapped timeline, a text segment associated with the selected wrapped timeline remains in focus, with the text segment being highlighted and adjustable handles added to each end of the text segment. The adjustable handles allow users to change the duration and placement of the selected wrapped timeline in the transcript.

Further embodiments of the present disclosure are directed to providing a lens visualization with additional mechanics when adjusting video effects using wrapped timelines applied to text segments in a transcript. In an example embodiment, the transcript interface includes a selected wrapped timeline with a highlighted text segment with adjustable handles on each end. During the detection of an input that selects one of the handles around the highlighted text segment, a viewing lens is displayed centered on the selected handle. Within the viewing lens, an emphasized portion of the transcript is displayed, allowing the user to make adjustments to the corresponding effect, such as the start or end of the video effect. The emphasized portion of the transcript can also include portions of wrapped timelines within the vicinity of the selected timeline. In some embodiments, the viewing lens also includes icons and/or labels corresponding to the adjusted video effect and the portions of wrapped timelines within the vicinity of the selected timeline. As such, the viewing lens provides users with an enhanced visualization and adjustment mechanic of an applied video effect while remaining within the transcript interface.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the embodiments of the disclosure will become better understood with regard to the following description, appended claims, and accompanying drawings where:

FIG. 9 is a flow diagram showing a method for applying video effects to a video via a transcript in a compact viewing mode, in accordance with embodiments of the present disclosure.

Figure 1A:
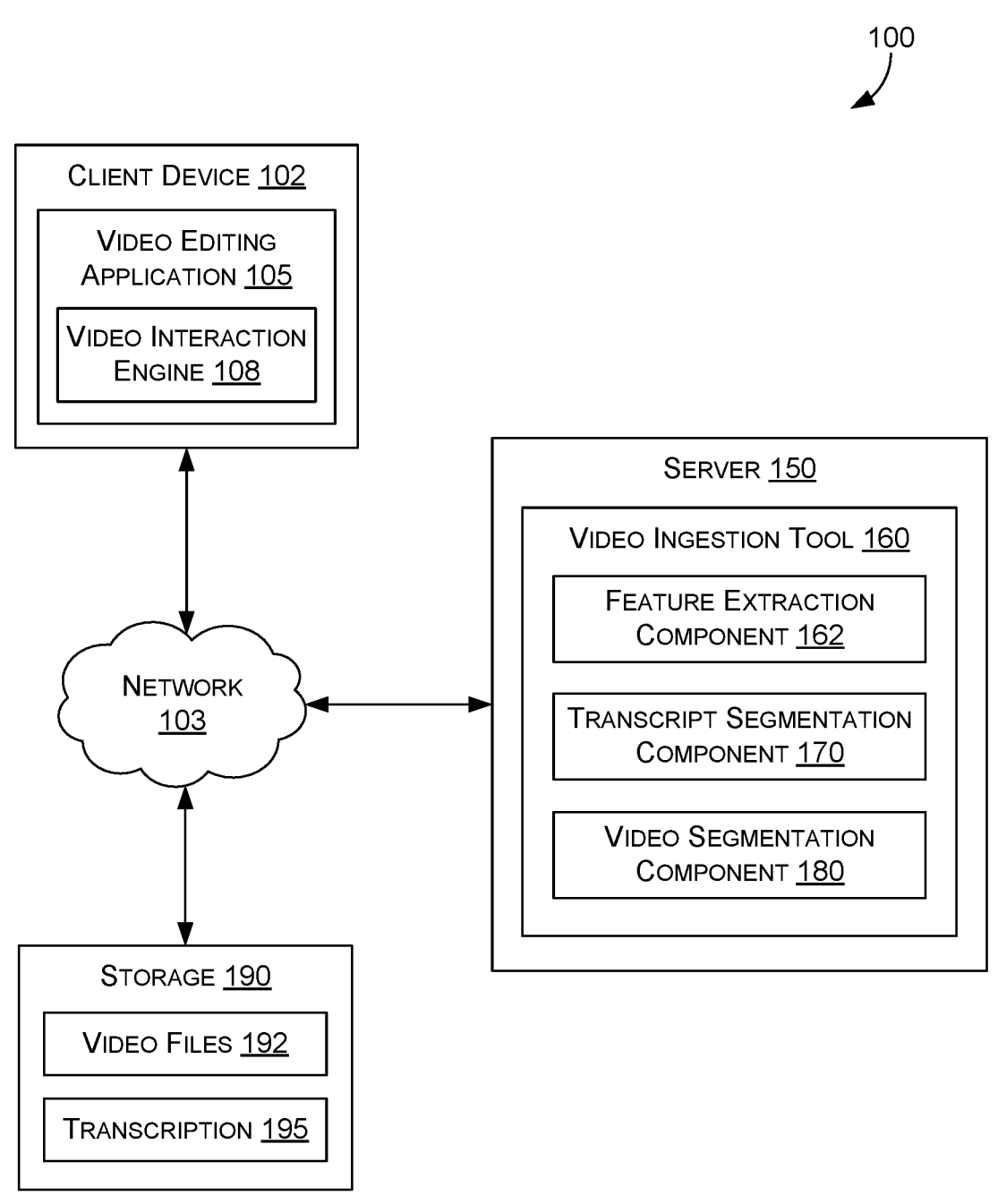
FIGS. 1A-1B are block diagrams of an example computing system for video editing or playback, in accordance with embodiments of the present disclosure.

While the present disclosure is amenable to various modifications and alternative forms, specifics thereof, have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to video editing and, more specifically, to providing mechanisms for multimedia effect addition and editing support for text-based video editing tools. While the present disclosure is not necessarily limited to such applications, various aspects of the disclosure may be appreciated through a discussion of various examples using this context.

Video editing, or nonlinear video editing, involves the process of manipulating and rearranging video shots to create a new work. Typically, video editing software is used to apply video edits to a work. The types of video edits possible include cutting segments (trimming), re-sequencing clips, audio effects, video effects, invisible effects, transitions, special effects, and the like. Conventional video editing interfaces allow users to select particular video frames through interactions with a video timeline that linearly represent frames on the timeline as a function of time and at positions corresponding to the time when each frame appears in the video.

The video timelines displayed by conventional video editing interfaces provide an area of a video editing application allowing users to arrange video clips and map out the video edits being applied. From the timelines, users are able to reorder, trim, and enhance the clips using various video edits. Additionally, timelines offer functions and tools such as selection tools, track select tools, ripple edit tools, razor tools, slip tools, pen tools, hand tools, type tools, and the like.

In the past, nonlinear video editing (NLE) has been performed on complex and expensive dedicated machines with dedicated software. However, video editing software has become widely available on personal computers, tablets, and smartphones. The need for video editing software has grown over the last decade as more social media video platforms have become widely available incorporating video. The exponential growth of social media video platforms has resulted in a corresponding increase in content creators who are generating video content, editing that video content, and uploading the video content to social media video platforms and elsewhere.

Limitations on traditional video editing tools remain, however, as the computer programs are expensive and complex, requiring the user to be trained to use generally complex user interfaces. To become adept, users of nonlinear video editing must acquire expert knowledge and training to master the processes and user interfaces for typical video editing systems. Because of the complexity, available nonlinear video editing systems can be intimidating for the general user.

Additionally, these video editing tools often rely on selecting video frames or corresponding time ranges. They are also inherently slow and fine-grained, resulting in editing workflows that are often considered tedious, challenging, or even beyond the skill level of many users. In other words, timeline-based video editing that requires selecting video frames or time ranges provides an interaction modality with limited flexibility, limiting the efficiency with which users interact with conventional video editing interfaces.

Embodiments of the present disclosure overcome the above, and other problems, by providing mechanisms for multimedia effect addition and editing support for text-based video editing tools. The mechanisms provide users with a more efficient representation of video effects using a text-based editing tool. Video effects applied to a video are represented as wrapped timelines (e.g., effect bars/effect tracks) displayed within a transcript of the video, where the wrapped timelines run along text segments in the transcript where a video effect is being applied to a corresponding video segment. Embodiments also provide more efficient interaction mechanisms, allowing the user to interact with the wrapped timelines applied in the transcript. The wrapped timelines allow users to quickly identify the different video effects and the effects' duration while also providing a means for rapidly modifying the video effects already applied to the video. As such, the present techniques provide users with a familiar look and feel of traditional timeline-based video editing tools while operating within a transcript using a text-based editing tool.

More specifically, embodiments of the present disclosure provide wrapped timeline visualizations of text segments in transcripts being displayed on a transcript interface of a text-based video editing tool. The wrapped timelines represent video effects being applied to video segments corresponding to the text segments in a transcript. The wrapped timelines are displayed along spans of the associated text segments and interspersed between the text lines in the transcript. In some aspects, the wrapped timelines represent the types of video effects applied. For instance, video effects can be represented by a particular wrapped timeline, and audio effects can be represented by another wrapped timeline vertically stacked with each other. Users select a wrapped timeline from the transcript interface to edit, and mechanisms described herein are utilized to adjust the corresponding effect.

In an example embodiment, a user interface (e.g., in a text-based video editor) displays a transcript of an audio track of a video. Upon receiving input selecting a text segment from the transcript (e.g., via a click or tap and drag along the transcript) and an input identifying a video effect to apply to a corresponding video segment (e.g., selected via a menu or panel with different options), the selected video effect is applied to the corresponding video segment. A wrapped timeline (e.g., effect track) representing the selected video effect is displayed in the transcript along the selected text segment. The wrapped timeline provides a visualization within the transcript, indicating the location of the video effect in the video relative to the corresponding selected text.

In some embodiments, a video effect is applied to a video segment corresponding to a selected text segment that spans multiple text lines of the transcript resulting in the wrapped timeline also spanning multiple text lines. The wrapped timeline associated with the video effect provides a visualization (e.g., an effect track, effect bar) along the transcript spanning across multiple lines of text.

In some embodiments, numerous video effects applied to the same text segment are visually represented using a common wrapped timeline (e.g., effect track) or composite wrapped timeline in the transcript. In an example embodiment, visual effects are grouped into one composite wrapped timeline, and audio effects are grouped into another composite wrapped timeline. In such embodiments, the composite wrapped timelines (e.g., effect tracks) are stacked and interspersed between applicable transcript lines.

In some embodiments, a user interface (e.g., in a text-based video editor) displays a transcript of an audio track of a video with one or more composite wrapped timelines (e.g., effect tracks) along spans of the transcript corresponding to the locations of the video where corresponding video effects are applied. Upon receiving input identifying a particular line of text in the transcript (e.g., a click or tap on the transcript line) corresponding to a composite wrapped timeline or input identifying the composite wrapped timeline (e.g., a click or tap on the composite wrapped timeline), the user interface displays an expanded representation of the composite wrapped timeline that presents multiple wrapped timelines representing multiple video effects to provide separate representations of each video effect corresponding to the composite wrapped timeline. As a result, selecting a line of text with an associated composite wrapped timeline or selecting a composite wrapped timeline serves to expand the composite wrapped timeline in the transcript into its constituent elements (e.g., different wrapped timelines/effect tracks for different video effects). In some embodiments, the user interface emphasizes the selected line of text by deemphasizing (e.g., greying out) the other lines of transcript text and associated wrapped timelines. In an example embodiment, overlapping visual effect tracks are grouped (e.g., above the emphasized line of text in the transcript), and audio effect tracks are grouped (e.g., below the emphasized line of text in the transcript) to provide a stacked visualization within the transcript. The visualization is of all video effects applied to a particular video segment corresponding to the selected line of transcript text.

In some embodiments, a user interface displays a transcript of an audio track of a video with one or more wrapped timelines (e.g., effect tracks) along spans of the transcript corresponding to the locations of the video where corresponding video effects are applied. Upon receiving input selecting (e.g., via a click or tap on) a particular wrapped timeline, icon, or label representing an applied video effect in the transcript, the user interface emphasizes (e.g., highlights) the text segment corresponding to the video segment represented by the selected wrapped timeline and applies adjustable handles to each end of the text segment. Upon receiving input selecting, holding, and/or moving a handle, the user interface displays an emphasized representation (e.g., a lens view) of the transcript (e.g., including transcript text, wrapped timelines, icons, labels) centered around the selected handle. Dropping the selected handle at a different transcript location changes the span of transcript text associated with the selected effect track (e.g., modifies which text of the transcript is selected) and serves as an instruction to change the range of the video (the video segment) where a corresponding video effect is applied. Accordingly, this lens view facilitates fine-tuned adjustments and trimming of video effects through interactions with the transcript.

In some embodiments, the wrapped timelines represent different video effects applied to a video segment via a text-based editing tool. For example, video effects include visual, audio, or invisible effects. Visual effects include, but are not limited to, changes in speed, distortions, reflections, artistic filters, stylistic color grading, animated transitions, three-dimensional elements, and the like. Audio effects include, but are not limited to, isolated sounds, specialty effects, foley sounds, ambient sounds, muting, and distortion. Invisible effects include, but are not limited to, color-correct footage, stabilization, and artistic effects to improve video quality. A user, via a transcript interface, selects a video effect type to use, and a corresponding wrapped timeline will display in the transcript to represent the location and type of video effect being applied.

In some embodiments, an icon is displayed next to each wrapped timeline to assist users in quickly identifying a video effect relating to a wrapped timeline applied in a transcript. The icon of a wrapped timeline represents the video effect type being applied to a video segment corresponding to the span of a text segment in the transcript. For instance, a video camera icon representing visual effects, a speaker emitting sound icon representing audio effects, and an eye icon representing invisible effects are potential icons. It should be noted, however, that any type of icon is usable to provide users with an indication of the type of effect associated with a wrapped timeline.

In some embodiments, a second wrapped timeline is displayed below an already displayed wrapped timeline along a span of a text segment in a transcript, and interspersed between the text lines, to represent a different effect type being applied to a text segment. For instance, a user applies a visual effect as well as an audio effect to a selected text segment in a transcript. In that instance, the transcript interface displays a wrapped timeline representing the visual effect and another wrapped timeline below the first wrapped timeline, representing the audio track. The dual wrapped timelines provide a more efficient visualization of the effects and effect types being applied on a text line.

In some embodiments, a composite wrapped timeline represents all visual effects being applied to a text segment, and a second composite wrapped timeline represents all audio effects being applied to the text segment. Upon selection of one of the composite wrapped timelines, the transcript interface displays an updated presentation of the applied video effects. If multiple effects are applied on a text line, then multiple wrapped timelines are displayed corresponding to the number of effects that are applied. For instance, if two visual effects are applied on a text line, then the wrapped timeline expands into two separate wrapped timelines representing each applied visual effect. The audio composite wrapped timeline also behaves similarly, such that all audio effects are compacted into a single audio wrapped timeline and are expandable into separate wrapped timelines upon selection of the audio wrapped timeline.

In another example embodiment, the transcript interface provides a text line focused viewing of a selected wrapped timeline where the transcript interface deemphasizes (e.g., fadeout, blur, pixelate) the other text lines in the transcript. The applied wrapped timelines, and the wrapped timelines relating to the text line, are vertically expanded and stacked. For instance, the visual wrapped timelines vertically stack below the text line to provide a visualization of each effect currently applied within that text line and a contextual placement of where each effect begins and ends. In some implementations, each stacked wrapped timeline also displays a corresponding icon and label to assist users in identifying each applied video effect. Additionally, the audio wrapped timelines vertically stack above the text line to provide the same visualization style as the visual effects but placed above the text line. The result is that all effects being applied on a text line are displayed at once, thereby allowing a user a more efficient visualization and representation of the applied video effects.

In some embodiments, once an applied wrapped timeline, icon, or label is selected from the transcript, the associated text segment is highlighted, and adjustable handles are placed on each end of the highlighted text segment. This interaction mechanism allows users to adjust and trim an effect based on the highlighted text segment. The highlighted text segment corresponds to a video segment location where the effect is applied. The adjustments contextually adjust the beginning and/or ending of the effect as it is applied to a corresponding video segment. In some embodiments, a snapping tool is provided to select and highlight individual words. For instance, when highlighting, a user automatically uses the snapping tool to highlight an entire word. In some instances, snapping occurs to a portion of the word where the snapping tool automatically highlights sections such as half of the word or a quarter of the word. As words are not linear and may appear lengthier in a transcript than what is actually spoken, the snapping tool allows users to snap to a portion of the word to provide a more efficient and fine-tuned approach when applying video effects to a transcript.

In an exemplary embodiment, upon detection of a selection of a handle placed on either end of a highlighted text segment, the transcript interface displays a lens centered on the selected handle in the transcript. Within the lens, an emphasized visualization of a portion of the transcript is displayed. The text line relating to the text segment remains in focus, and the text lines unassociated with the highlighted text segment become deemphasized. As a user adjusts or trims an effect using the handle, the lens follows the movement to provide for fine-grained adjustments to the effect.

In some embodiments, the viewing lens also includes icons and labels corresponding to the video effect being adjusted as well as a portion of the wrapped timelines within the vicinity of the selected timeline. For instance, the lens displays wrapped timelines, icons, and labels of effects that are in proximity to the video effect being adjusted. This provides users with a visual aid and provides them with more context when adjusting a video effect. For instance, a user may want to adjust a video effect to begin at the same time as another. In some implementations, the lens displays surrounding video effects and allows a user to trim the selected video effect so that it begins, or ends, at the same time as the surrounding video effect displayed by the viewing lens.

Thus, the illustrative embodiments provide various improvements over conventional techniques. For example, embodiments that provide a wrapped timeline representing a video effect provide more efficient interaction mechanisms than prior techniques by allowing users to apply video effects via a transcript while also having the means to edit and trim the video effects within the transcript. Embodiments supporting multiple wrapped timelines provide more efficient visualizations that allow users to identify the different characteristics of the applied video effects. The characteristics include the effects' duration, starting point, ending point, and type of effect. The wrapped timelines also provide mechanisms for modifying the video effects already applied to a video. Furthermore, the present techniques provide a more efficient representation of applied video effects over prior techniques by providing users with a familiar look and feel to traditional timeline-based video editors while performing video edits within a transcript.

Example Video Editing Environment

Referring now to FIG. 1A, a block diagram of an example video editing environment 100 suitable for use in implementing embodiments of the disclosure is shown. Generally, the video editing environment 100 is suitable for video editing or playback, and, among other things, facilitates text-based video editing, effect visualization, text-based editing, and/or video playback. The video editing environment 100 includes a client device 102, a server 150, a storage 190, and is communicatively coupled via a network 103. For purposes of the present description, it will be assumed that the illustrative embodiments are being implemented as part of a video editing application 105 operating on the client device 102. However, this is only one possible implementation and is not intended to be limiting to the present disclosure. Other implementations in which video editing applications 105 are utilized (e.g., browser, cloud-based) may also be used without departing from the spirit and scope of the present disclosure.

In various embodiments, the client device 102 and/or the server 150 are any kind of computing device, such as computing device 1200 described below with reference to FIG. 12. Examples of computing devices include a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, some combination thereof, or any other suitable computer device.

In various implementations, the components of the video editing environment 100 include computer storage media that stores information including data, data structures, computer instructions (e.g., software program instructions, routines, or services), and/or models (e.g., machine learning models) used in some embodiments of the technologies described herein. For example, in some implementations, client device 102, server 150, and/or storage 190 include one or more data stores (or computer data memory). Further, while the client device 102, the server 150, and the storage 190 are each depicted as single components in FIG. 1A, the video editing environment 100 can include more than one client device 102, server 150, and/or storage 190 and is implementable using any number of data stores and/or implemented using cloud storage.

The components of the video editing environment 100 are communicatively coupled via the network 103. In some embodiments, the network 103 includes one or more local area networks (LANs), wide area networks (WANs), and/or other networks. The communication path provided by the network 103 is configurable as a point-to-point over public and/or private networks. The communication can occur over a variety of networks, including private networks, VPN, MPLS circuit, or Internet, and that use appropriate application programming interfaces (APIs) and data interchange formats such as Representational State Transfer (REST), JavaScript Object Notation (JSON), Extensible Markup Language (XML), Simple Object Access Protocol (SOAP), Java Message Service (JMS), and/or Java Platform Module System.

In some embodiments, communication is encrypted. The communication is generally over a network such as the LAN, WAN, telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, 5G, Wi-Fi and WiMAX.

Figure 1B:
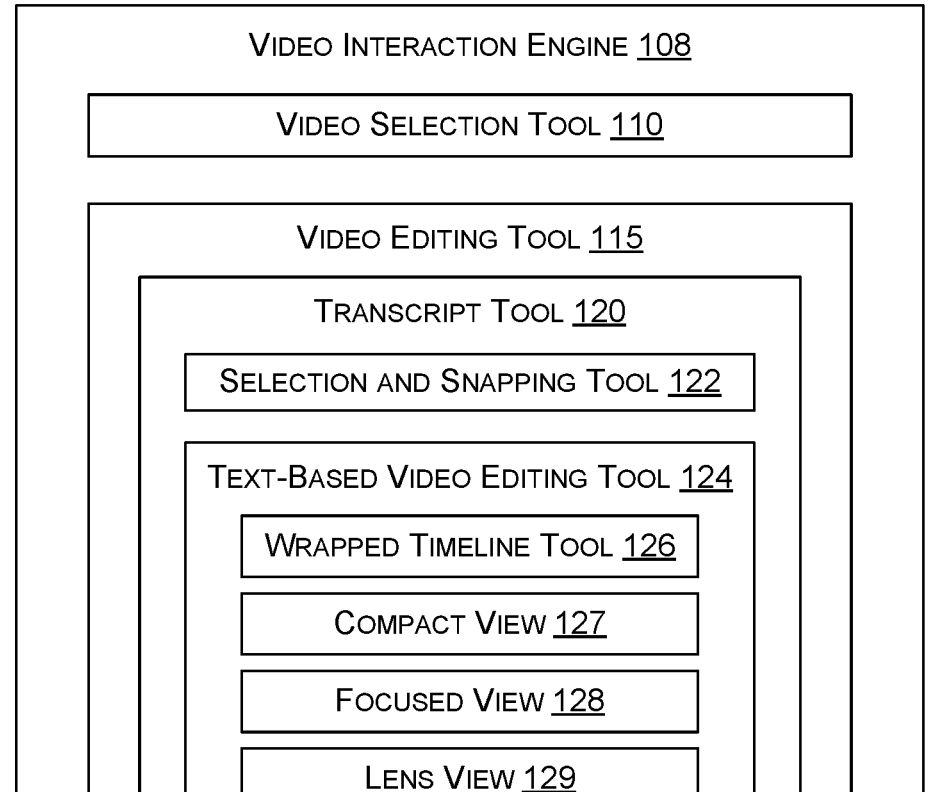

In the example illustrated in FIGS. 1A and 1B, the client device 102 includes a video editing application 105, and the server 150 includes a video ingestion tool 160. In various embodiments, video interaction engine 108, video ingestion tool 160, and/or any of the elements illustrated in FIGS. 1A and 1B are incorporated, or integrated, into an application(s) (e.g., a corresponding application on client device 102 and server 150, respectively), or an add-on(s) or plug-in(s) to an application(s). In some implementations, the video editing application 105 is any application capable of facilitating video editing or playback, such as a stand-alone application, a mobile application, a web application, and/or the like. In some implementations, the video editing application 105 includes a web application, for example, that is accessible through a web browser, hosted at least partially server-side, and/or the like. Additionally, or alternatively, the video editing application 105 is a dedicated application operating on the client device 102. In some cases, the video editing application 105 is integrated into an operating system (e.g., as a service). Examples of video editing applications include ADOBE PREMIERE PRO and ADOBE PREMIERE ELEMENTS. Although some embodiments are described with respect to a video editing application 105 and a video interaction engine 108, some embodiments implement aspects of the present techniques in any type of application, such as those involving text-based video editing, transcript processing, visualization, and/or interaction.

In various embodiments, the functionalities described herein are allocated across any number of devices. In some embodiments, the video editing application 105 is hosted at least partially server-side, such that the video interaction engine 108 and the video ingestion tool 160 coordinate (e.g., via the network 103) to perform the functionalities described herein. In some embodiments, the video interaction engine 108 and the video ingestion tool 160 (or some portion thereof) are integrated into a common application executable on a single device (e.g., the client device 102, the server 150). Although some embodiments are described with respect to an application(s), in some embodiments, any of the functionality described herein is additionally or alternatively integrated into an operating system (e.g., as a service), a server (e.g., a remote server), a distributed computing environment (e.g., as a cloud service), and/or otherwise. These are just examples, and any suitable allocation of functionality among these or other devices may be implemented within the scope of the present disclosure.

The video ingestion tool 160 is a component of the server 150 configured to extract various features from a video (e.g., transcript) and to generate and store extracted features of that video in the storage 190. The video ingestion tool 160 includes a feature extraction component 162, a transcript segmentation component 170, and a video segmentation component 180.

The feature extraction component 162 is a component of the video ingestion tool 160 configured to detect, extract, or otherwise determine various features (e.g., the transcript 195) from a video. In some embodiments, the feature extraction component 162 processes an audio track of a video to generate a transcript 195 of the audio track. Timecodes are utilized so that the individual words in the transcript 195 correspond to the audio track. Using this technique, a timecode is associated with each spoken word in the audio track and associated with each written word in the transcript 195, allowing selected text segments to be associated with corresponding audio and video segments using the timecodes.

A timecode is a video synchronizing standard that is based on a 24-hour clock readout. Each frame of video is assigned a unique timecode value. The timecode is a sequence of numeric codes generated at regular intervals by a timing synchronization system. Timecodes are used in video production applications which require temporal coordination of elements related to video frames, audio frames, and transcript 195.

Basic timecode standards assume a video framerate of 30 frames-per-second ("FPS") or 25 FPS, depending on the country. The National Television Standards Committee ("NTSC") video standard, used principally in the United States and some other countries have a frame rate of 30 FPS, phase alternate line ("PAL"). Sequential color and memory ("SECAM"), used mainly in Europe, has a frame rate of 25 FPS. In NTSC, 30 frames equal one second. Video in color or Digital Television ("DTV")/High Definition Television ("HDTV") has a framerate in the United States of 29.97 FPS.

In some embodiments, the feature extraction component 162 tracks the timecode associated with each spoken word in the transcribed text abstracted from the video's audio track. The transcription of each spoken word is correlated to the audio track timecode and the video track timecode in the video. As such, the video corresponding to each spoken word is identifiable in the transcript 195.

The transcript segmentation component 170 is a component of the video ingestion tool 160 configured to segment the transcript 195 to improve readability, understandability, and improve interactions with the transcript 195. The transcript segmentation component 170 identifies sentence segments from the transcript 195 generates sentence embeddings for each sentence segment (or access previously generated sentence embeddings. The transcript segmentation component 170 is further configured to break long paragraphs (e.g., longer than a designated length or duration) into multiple smaller paragraphs at sentence boundaries using dynamic programming to minimize a cost function that penalizes candidate segmentations based on divergence from a target paragraph length, that rewards candidate segmentations that group semantically similar sentences into a common paragraph, and/or that penalizes candidate segmentations that include candidate paragraphs with long pauses (e.g., longer than a normalized length or duration).

The video segmentation component 180 is a component of the video ingestion tool 160 configured to identify candidate boundaries for video segments based on sentences boundaries and word boundaries in the transcript 195. The video segmentation component 180 is further configured to identify sentence segments from the transcript 195 and to segment the sentence segments into word segments based on the transcript 195.

In some embodiments, the video segmentation component 180 stores a representation of the video segmentation defined by the boundaries of the word and/or sentence segments (e.g., the video segmentation) using one or more data structures. As such, video ingestion tool 160 and/or video editing application 105 access a video (e.g., one of video files 192), generate a transcript (e.g., transcription 195), and generate and store a representation of one or more segmentation(s) of the video, constituent video segments of the video segmentation(s) (e.g., video files 192), and/or some representation thereof in any suitable storage location, such as the storage 190, the client device 102, the server 150, some combination thereof, and/or other locations.

Provided is an example workflow of the video editing environment 100 as described and illustrated in FIGS. 1A and 1B. To begin, the client device 102 is a desktop, laptop, or mobile device such as a tablet or smart phone, and the video editing application 105 provides one or more user interfaces. In some embodiments, a user accesses a video through the video editing application 105, and/or otherwise uses the video editing application 105 to identify the location where a video is stored (whether local to the client device 102, at some remote location such as the storage 190, or otherwise stored in a location accessible by the network 103). Additionally, or alternatively, a user records a video using video recording capabilities of the client device 102 (or some other device) and/or some application executing at least partially on the device (e.g., ADOBE BEHANCE). In some cases, the video editing application 105 uploads the video (e.g., to some accessible storage 190 for video files 192) or otherwise communicates the location of the video to the server 150, and the video ingestion tool 160 receives or accesses the video and performs one or more ingestion functions on the video including transcribing the audio track of the video into transcribed text files.

During operation, when a new editing and assembly project is initiated, the user's transcribed text files are transferred into the video interaction engine 108. The video editing application 105 includes user interfaces and a set of user tools for editing a video from the video files 192 and the transcript 195. Embodiments of the disclosure use the transcript 195 to select and sequence video segments into an assembled video. Using the transcript 195 of the audio track, the user selects text segments and adds video effects based on the selected text segments. The video editing application 105 allows users to experiment with different video effects during assembly and editing of a video file 192. The resulting video may be a rough-cut video in which various video segments are assembled in proper sequence.

As described in more detail, the video editing application 105 performs video edits and applies video effects through a transcript on a transcript interface. The video effects are applied through the selection of words, phrases, or text segments from the transcript and applies a video effect to a video segment associated (e.g., through the use of a time-code technique) with the word, phrase, or text segment. The video editing application 105 then automatically applies and arranges the selected video effect onto the video segment such that when the video is played at the time when the selected word, phrase, or text segment is spoken, the video effect will also appear. The video editing application 105 also applies a wrapped time along a span of the selected text segment so as to provide a visualization in the transcript that a video effect is applied.

In some embodiments, after applying the intended video effects, the user may export the video to a secondary video editing system such as Avid media composer, Adobe Premier, Final Cut Pro, to provide finishing touches to the rough cut and arrive at a fine-cut version. In some embodiments, the video editing application 105 produces a completed video, without the need for post-processing in a nonlinear editor.

It is noted that FIG. 1A is intended to depict the major representative components of a video editing environment 100. In some embodiments, however, individual components may have greater or lesser complexity than as represented in FIG. 1A, components other than or in addition to those shown in FIG. 1A may be present, and the number, type, and configuration of such components may vary.

Referring now to FIG. 1B, the video interaction engine 108 is a component of the video editing application 105 configured to provide one or more user interfaces with one or more interaction elements that allow a user to interact with a video. For example, techniques used by the video interaction engine 108 apply video effects to a video using various interactions with text segments of a transcript 195 of the video. The video interaction engine 108 includes a video selection tool 110 and a video editing tool 115 including a transcript tool 120.

The video selection tool 110 is a component of the video editing tool configured to provide one or more videos and/or video segments with corresponding transcriptions to the video editing tool 115. The transcript tool 120 is a component of the video editing tool 115 configured to provide one or more video editing functions performable via the transcript 195. The transcript tool 120 includes a selection and snapping tool 122 and a text-based video editing tool 124.

The selection and snapping tool 122 is a component of the transcript tool 120 configured to accept an input selecting individual sentences, text segments or words from the transcript 195 (e.g., by clicking or tapping and dragging across the transcript) and identifies a video segment with boundaries that snap to the locations of previously determined boundaries (e.g., audio cuts) corresponding to the selected sentences, text segments, and/or words from the transcript 195. The selection and snapping tool 122 determines the corresponding video frames and audio frames of the video segment relating to the transcript 195. For example, a selected text segment within the transcript 195 corresponds to the video segment where the words are being spoken.

In some embodiments, the selection and snapping tool 122 accepts an input selecting an applied video effect (e.g., clicking or tapping a wrapped timeline/effect bar, icon, label) displayed in the transcript 195 of a transcript interface and identifies an adjacent wrapped timeline with boundaries that snap to the location of previously determined boundaries corresponding to a starting pointing or ending point of the adjacent wrapped timeline. In some implementations, the selection and snapping tool 122 determines the corresponding video effect corresponding to a wrapped timeline such that there is a seamless transition between the video effects.

The text-based video editing tool 124 is a component of the transcript tool 120 configured to accept video effects selections and text segment selections taken from the transcript 195, and in response, perform corresponding video editing operations on corresponding video segments associated with the text segment. The text-based video editing tool 124 includes a wrapped timeline tool 126, a compact view module 127, focused view module 128, and a viewing lens view module 129.

The wrapped timeline tool 126 is a component of the text-based video editing tool 124 configured to apply and display wrapped timelines along spans of text segments in a transcript 195 displayed on a transcription interface. The wrapped timelines act as a type of effect track/bar in the transcript 195 that provide a visual representation of applied video effects. Interaction mechanisms provided by the wrapped timelines also enable users to explore, discover, and/or modify characteristics (e.g., duration, start point, end point, video effect type) of corresponding video effects. Modifications occur through the interactions with the wrapped timelines in the transcript and/or corresponding text lines in the transcript 195.

In some embodiments, the wrapped timeline tool 126 applies composite wrapped timelines representing multiple effect types being applied along a span of a text line of the transcript 195. For example, a composite wrapped timeline is interspersed between corresponding text lines of the transcript and along spans of the text segments with applied video effects. In some embodiments, wrapped timeline tool 126 positions the wrapped timelines above and/or below the text line while still interspersed between the corresponding text lines. As described, during the video editing process, a text segment is selected, and a video effect is applied, resulting in a wrapped timeline being visualized along a span of the text segment with the applied video effect. In some implementations, additional video effects are also applied to the same text segment and/or portions of the text segment. In these instances, additional visualizations indicate that multiple video effects are being applied on a given text line. In some configurations, these visualizations include icons and/or labels for each applied video effect. For example, icons such as a video camera, reel, clapperboard, and the like can represent visual effects. Icons such as speakers, microphones, headphones, and the like can represent audio effects. In some implementations, the labels include any word or phrase that indicates the type of video effect being applied and/or any word or phrase provided by the user. These additional visualizations are positioned along a composite wrapped timeline to indicate a starting location of each video effect, respectively.

In some implementations, the wrapped timeline tool 126 applies wrapped timelines that wrap to a subsequent text line when a text segment extends beyond its initial text line. For instance, words within a text segment can span multiple text lines. When a video effect is applied to the text segment, a wrapped timeline is displayed such that it begins at the originating word of the text segment and continues to the subsequent text lines. As such, a wrapped timeline spans multiple text lines to represent a video effect in the transcript 195 aligned and wrapped across the spans of the corresponding text lines.

In some embodiments, the wrapped timeline tool 126 applies and displays multiple wrapped timelines along a text line for multiple effect types applied to text segments within the text line. For instance, a first wrapped timeline representing one or more visual effects could be interspersed between corresponding text lines of the transcript and along spans of the text segments, and a second wrapped timeline representing one or more audio effects could also be interspersed between the same corresponding text lines of the transcript and stacked either above or below the first wrapped timeline along spans of the text segments. These wrapped timelines overlap and remain interspersed between the text lines in the transcript. As such, the separately wrapped timelines each represent different video effect types being applied to text segments of a text line in a transcript.

In some embodiments, the wrapped timeline tool 126 applies different visualizations (e.g., different colors, different line thicknesses, different dashed lines, etc.) to the wrapped timelines based on the effect type of the corresponding applied video effects. For instance, a text segment with an applied visual effect has a blue wrapped timeline. Another text segment and/or the same text segment with the visual effect has a green wrapped timeline corresponding to an applied audio effect. It should be noted that any color variation is usable. As such, the color variations in the wrapped timelines are seen as another visualization mechanism to assist users in identifying the location of applied video effects as well as the type of effects being applied on text segments of a text line.

The compact view module 127 is a component of the text-based video editing tool 124 configured to provide a compact viewing mode of a transcript interface displaying the transcript 195. The compact viewing mode provides a visualization and organization of one or composite wrapped timelines applied on a transcript via transcript interface. A composite wrapped timeline corresponds to multiple video effects. In some implementations, while in the compact viewing mode, two composite wrapped timelines are used to represent different effect types being applied to text segments of a text line in a transcript. In some implementations, visual effects being applied to text segments of a text line correspond to a first composite wrapped timeline, and audio effects applied to text segments in the transcript correspond to a second composite wrapped timeline. In some instances, if there is only one effect type being applied on a given text line, then only a single composite wrapped timeline is displayed corresponding to that effect type. In some embodiments, icons are presented for each effect type adjacent to (e.g., under, above, beside) the corresponding wrapped timeline of a video effect. In instances where multiple video effects are represented by a composite wrapped timeline, icons of the applied video effects can be listed in the order in which they were applied, with each subsequent icon being added to the right of the other icons already present in the transcript.

In some embodiments, the compact view module 127 displays an unassociated wrapped timeline (i.e., a wrapped timeline that is not associated with a video effect) interspersed between the text lines in the transcript. The unassociated wrapped timeline can have an initial neutral color (e.g., grey), indicating no association with any video effects. Upon receiving input identifying a selected video effect in association with a selected text segment, a portion of the unassociated wrapped timeline can alter its color (e.g., green, blue) to provide a visualization of the selected video effect in the transcript.

In some embodiments, an interaction modality (e.g., a mouse hover, pointer hover) occurs on a displayed wrapped timeline and/or displayed icon that causes display of a label corresponding to the applied video effect. For example, upon receiving an input, such as a mouse hovering over an icon representing a video effect, the compact view module 127 displays a label relating to the applied video effect adjacent to the pointer device causing the interaction. The compact viewing mode provided by the compact view module 127 is described in more detail below with respect to FIG. 2.

The focused viewing module 128 is a component of the text-based video editing tool 124 configured to provide a focused viewing mode of a transcript interface displaying the transcript 195. The focused viewing mode provides a visualization and organization of wrapped timelines applied on a transcript via the transcript interface. In some implementations, the focused view module 128 provides the focused viewing mode in response to an input selecting (e.g., clicking or tapping) a text line, wrapped timeline, icon, or label displayed on the transcript 195. While in the focused viewing mode in some configurations, the corresponding text line associated with the input selection remains focused, and the remaining text lines displayed in the transcript interface are deemphasized (e.g., fadeout, blurred, mask, hide). In some embodiments, the wrapped timeline associated with the input selection can span multiple text lines. In those instances, the wrapped timeline remains on display, not only on the focused text line but also on the deemphasized text line. For example, a selected wrapped timeline wraps to a subsequent text line and ends within that text line. While in the focused viewing mode, the wrapped timeline is shown to start at a word within the focused text line and end in the subsequent deemphasized text line.

In some embodiments, the focused view module 128 expands composite wrapped timelines. While in the focused view, and when at least one composite wrapped timeline is applied to a text segment of the focused text line, a composite wrapped timeline relating to the text line is expanded to present an individual wrapped timeline for each video effect. In some implementations, when expanded, the wrapped timelines are vertically stacked. In some configurations, the wrapped timelines are grouped based on effect type. For instance, the wrapped timelines for audio effects could be placed above the text line, and the wrapped timelines for video effects could be placed below the text line. It should be noted, however, that the placement of the wrapped timelines is interchangeable, and that the above implementation is only for illustrative purposes. In some embodiments, each wrapped timeline includes an icon and/ or a label relating to the effect type of the respective wrapped timeline. While in the focused viewing mode, any number of applied wrapped timelines are visualized as they are vertically placed above and/or below the focused text line. In some embodiments, upon receiving an input selection (e.g., click, tap, hover) of an expanded wrapped timeline, the selected wrapped timeline is highlighted along the focused text line but also along deemphasized text lines if the selected wrapped timeline spans multiple text lines.

In some implementations, while the transcript interface is in the focused viewing mode, and upon detection of an input selection (e.g., click or tap) selecting an expanded wrapped timeline, the visualizations are rearranged on the transcript interface such that the wrapped timeline moves above or below the given text line where it is placed temporally over its corresponding text segment. In some implementations, the visualization corresponds to a text segment being highlighted. In some implementations, adjustable handles are placed on each end of the highlighted region. Each adjustable handle allows for temporal adjustment and/or trimming of the applied video effect corresponding to the selected wrapped timeline. Upon detection of the selection of a handle (e.g., holding down the pointer and moving the adjustable handle over displayed text), a lens viewing mode is activated and is described below. The focused viewing mode provided by the focused viewing module 128 is described in more detail below with respect to FIG. 3.

The lens viewing module 129 is a component of the text-based video editing tool 124 configured to provide a lens viewing mode of a transcript interface displaying the transcript 194. The lens viewing mode provides a visualization and organization of wrapped timelines applied on a transcript in relation to a viewing lens centered on a selected adjustable handle of a highlighted text segment. In some implementations, the lens viewing module 129 provides the lens viewing mode in response to input selection (e.g., holding down the pointer) of an adjustable handle of a highlighted text segment by displaying a viewing lens centered over the selected handle. Trimming the applied video effect is performed when dragging the handle to either expand or shorten the applied video effect. In some implementations, the lens viewing module 129 displays surrounding wrapped timelines in the vicinity of the text line associated with the applied video effect. In some embodiments, the wrapped timelines displayed within the viewing lens includes icons and labels corresponding to the effect type associated with the wrapped timeline and portions of wrapped timelines in the vicinity of the text line. The lens viewing mode provided by the lens view module 129 is described in more detail below with respect to FIG. 5.

It is noted that FIG. 1B is intended to depict the major representative components of an exemplary video interaction engine 108. In some embodiments, however, individual components may have greater or lesser complexity than as represented in FIG. 1B, components other than or in addition to those shown in FIG. 1B may be present, and the number, type, and configuration of such components may vary.

Figure 2:
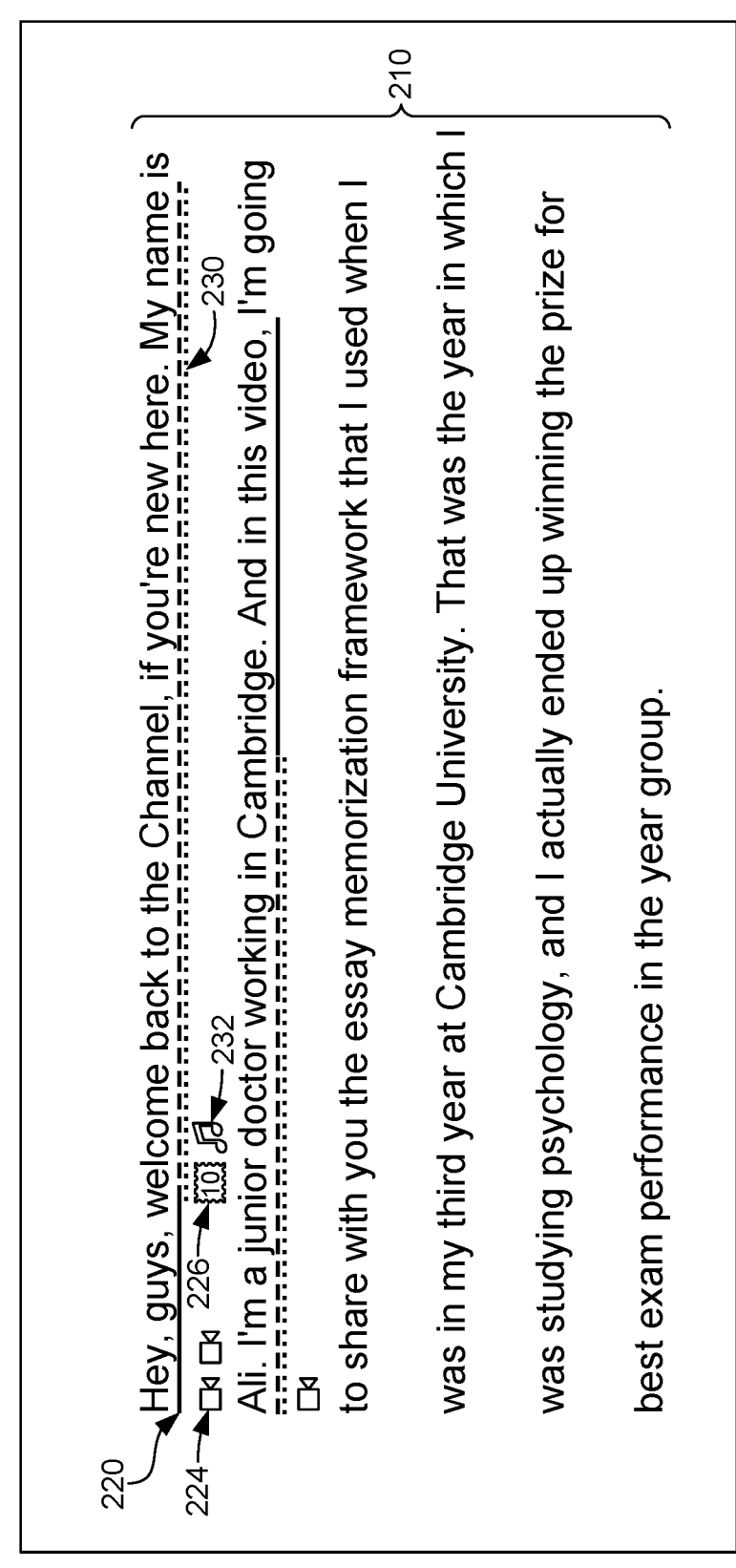
FIG. 2 illustrates an example transcript interface displaying a compact view of wrapped timelines in a transcript, in accordance with embodiments of the present disclosure.

FIG. 2 illustrates an example transcript interface 200 for text-based video editing, in accordance with embodiments of the present disclosure. In this example, the transcript interface 200 presents a visualization of a loaded video's transcript 210 and wrapped timelines 220, 230 corresponding to multiple video effects applied to video segments corresponding to text segments in the transcript 210. The transcript interface 200 provides a compact view of the applied video effects as the wrapped timelines 220 and 230 represent multiple video effects being applied on text segments of the text line.

In FIG. 2, the transcript interface 200 displays the transcription 210 of a video during the video editing process. The transcription 210 has already been performed and is presented in the transcript interface 200. Depending on the embodiment, the transcript interface 200 presents an example wrapped timeline visualization technique depicting a compact view of the transcript 210 with composite wrapped timelines 220, 230. Using techniques described herein, the composite wrapped timeline 220 represents visual effects applied to video segments corresponding the first two text lines of the transcript 210. The composite wrapped timeline 230 represents audio effects applied to video segments corresponding to the first two text lines of the transcript 210. As illustrated, the composite wrapped timeline 230 is visualized below the composite wrapped timeline 220. In some embodiments, each applied video effect represented by the composite wrapped timelines 220, 230 is identified using icons, such as the icons 224, 226, 232. The icons represent video effect types relating to the applied video effect and are positioned along the composite wrapped timelines 220, 230 representing their respective applied video effect.

As shown, the composite wrapped timelines 220, 230 divide the text lines into text segments corresponding to the contextual location of the applied video effects. In this example, the text segments span multiple text lines. In some embodiments, the display screen includes a video window (not shown) displaying video frames with the applied video effects corresponding to the transcribed text segments with wrapped timelines.

Figure 3:
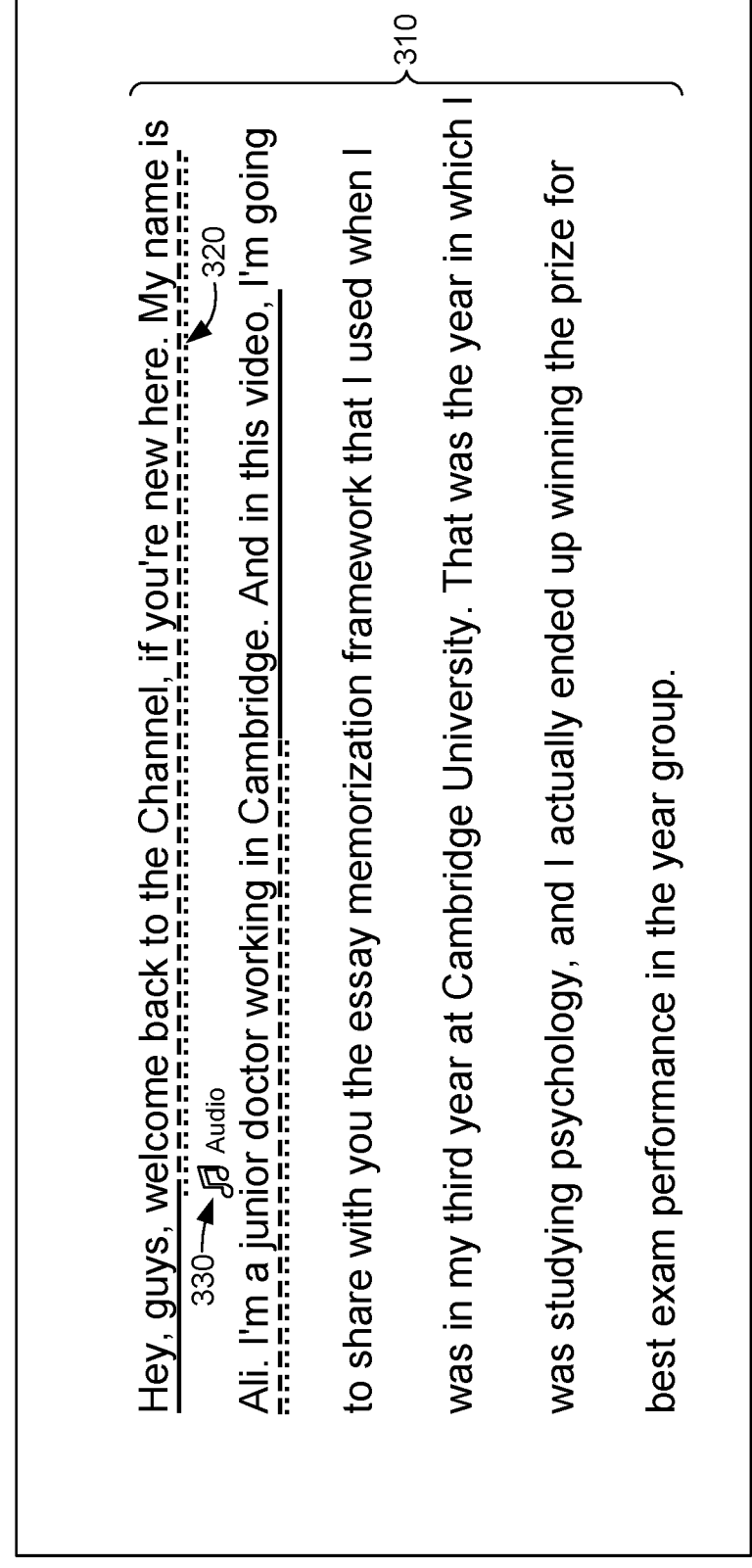
FIG. 3 illustrates an example transcript interface displaying a hover effect within a compact view of wrapped timelines in a transcript, in accordance with embodiments of the present disclosure.

FIG. 3 illustrates an example transcript interface 300 for text-based video editing, in accordance with embodiments of the present disclosure. In this example, the transcript interface 300 presents a visualization of a loaded video's transcript 310 and a wrapped timeline 320 corresponding to a video effect applied to video segments corresponding to text segments in the transcript 310. The transcript interface 300 provides a compact view of the applied video effect, and the wrapped timeline 320 represents a video effect being applied to a video segment corresponding to a text segment in the transcript. The wrapped timeline 320 includes an icon 330 providing an indicator of the type of video effect being applied (i.e., an audio effect in this example).

In FIG. 3, the transcript interface 300 displays the transcription 310 of a video during the video editing process. The transcription 310 has already been performed and is presented in the transcript interface 300. Depending on the embodiment, the transcript interface 300 presents an example wrapped timeline visualization technique depicting a compact view of the transcript 310 with the wrapped timeline 320. Using techniques described herein, the composite wrapped timeline 320 represents an audio effect applied to a video segment corresponding to the first two text lines of the transcript 310. The transcript interface 300 provides an illustrative example of a hover effect that occurs when a pointer hovers over an icon and/or a wrapped timeline. In this example, when the pointer hovers over the wrapped timeline 320 with a pointer device, a corresponding icon 330 and/or label (i.e., "Audio") are presented and displayed in the transcript 310. In some implementations, when the hover effect is initiated, other wrapped timelines, icons, and/or labels are deemphasized (e.g., hidden, blurred, grayed out) to emphasize the selected wrapped timeline corresponding to the hovering pointer. As shown, the wrapped timeline 320 is a span along a text segment spanning two text lines in the transcript 310. The wrapped timeline 320 corresponds to the contextual location of the applied video effect.

Figure 4:
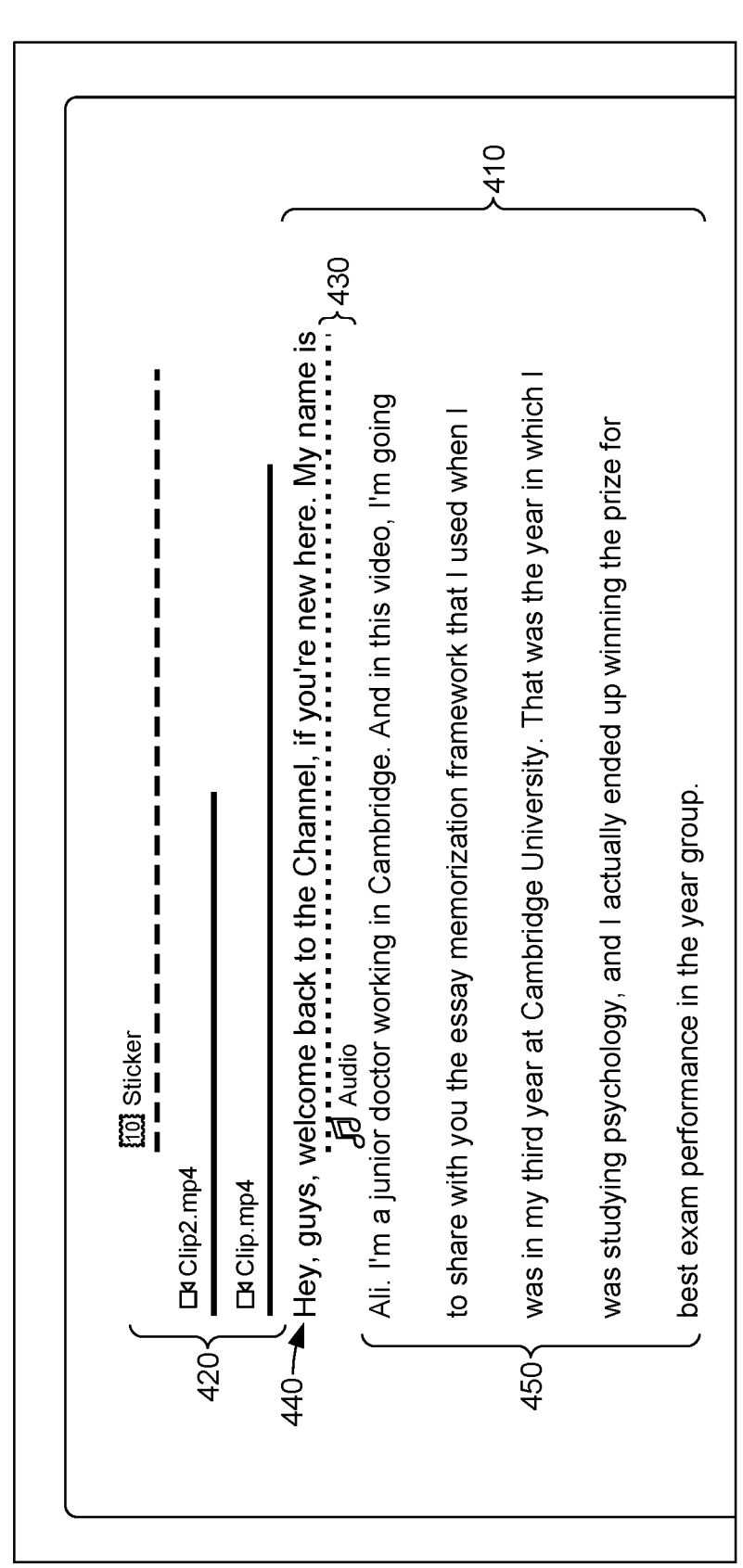
FIG. 4 illustrates an example transcript interface displaying a focused view of wrapped timelines in a transcript, in accordance with embodiments of the present disclosure.

FIG. 4 illustrates an example transcript interface 400 for text-based video editing, in accordance with embodiments of the present disclosure. In this example, the transcript interface 400 presents a visualization of a loaded video's transcript 410 with an expanded visualization of wrapped timelines 420, 430 relating to a selected text line in the transcript 410. The transcript interface 400 provides a focused viewing mode of a selected text line 440 from the transcript 410 as the wrapped timelines 420 and 430 are vertically stacked and presented during the editing process of a video.

In FIG. 4, the transcript interface 400 displays the transcription 410 of a video during the video editing process. The transcription of the video has already been performed (e.g., some transcription tool described in FIG. 1A) and is presented in the transcript interface 400. Depending on the embodiment, the transcript interface 400 presents an example wrapped timeline visualization technique depicting a focused view mode of the transcript 410 with applied wrapped timelines 420, 430. Using techniques described herein, the focused view mode is shown on the transcript interface 400 after an interaction modality (e.g., wrapped timeline, icon, label selection) is used to select a text line with at least one applied video effect. The selected text line 440 associated with the applied video effect remains in focus. The remaining transcript text 450 displayed on the transcript interface 410 is deemphasized (e.g., faded) so as to focus the attention of a user to the particular text line 440. The wrapped timelines 420, 430 applied on text segments of the text line 440 are also visualized. The wrapped timelines 420 correspond to different visual effects and are vertically stacked above the text line 440. Each of wrapped timelines 420 is displayed over the text segment on which it was applied. For example, the first of the wrapped timelines 420 (i.e., the wrapped timeline with the "10" icon and labeled "Sticker") is displayed over the text segment "welcome back to the Channel, if you're new here. My name is" to convey the location of the applied visual effect. The wrapped timeline 430 corresponds to an audio effect and is displayed below the text line 440. In some embodiments and as shown, each visual wrapped timeline and each audio wrapped timeline includes an icon representing an effect type relating to the applied video effect as well as a label corresponding to a name of the applied video effect.

Note that FIG. 4 illustrates example icons visualizing the video effects corresponding to the wrapped timelines. For example, the wrapped timelines 320 for visual effects include a "10" icon or a video camera icon, and the wrapped timeline 330 for the audio effect includes an audio icon. However, different icons are usable to indicate various types of video effects and should be seen as visualization tools to assist users in knowing what video effects are associated with each wrapped timeline. In the example illustrated in FIG. 4 the wrapped timelines also include labels. The labels, much like the icons, should be seen as mechanisms in helping users identify the applied video effects associated with the wrapped timelines. In some embodiments, the labels are user created, and in some other embodiments, the labels state the effect type that is applied.

Figure 5:
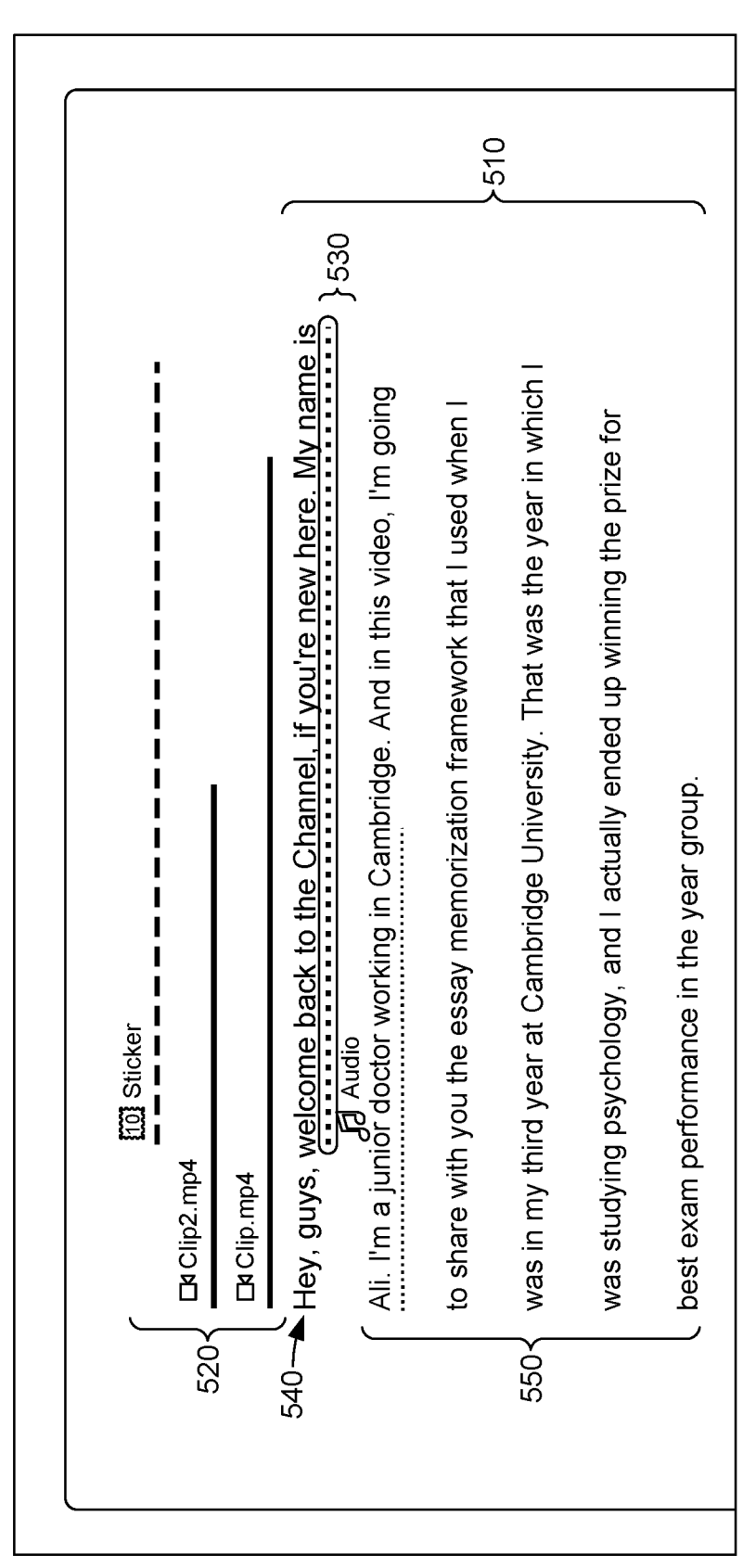
FIG. 5 illustrates an example transcript interface displaying a hover effect within a focused view of wrapped timelines in a transcript, in accordance with embodiments of the present disclosure.

FIG. 5 illustrates an example transcript interface 500 for text-based video editing, in accordance with embodiments of the present disclosure. In this example, the transcript interface 500 presents a visualization of a loaded video's transcript 510 with an expanded visualization of wrapped timelines 520, 530 relating to a selected text line in the transcript 510. The transcript interface 500 provides a focused viewing mode of a selected text line 540 from the transcript 510 as the wrapped timelines 520 and 530 are vertically stacked and presented during the editing process of a video.

In FIG. 5, the transcript interface 500 displays the transcription 510 of a video during the video editing process similar to that of FIG. 4. The transcription of the video has already been performed (e.g., some transcription tool described in FIG. 1A) and is presented in the transcript interface 500. Depending on the embodiment, the transcript interface 500 presents an example wrapped timeline visualization technique depicting a focused view mode of the transcript 510 with applied wrapped timelines 520, 530. Using techniques described herein, the focused viewing mode is shown on the transcript interface 500 after an interaction modality (e.g., wrapped timeline, icon, label selection) is used to select a text line with at least one applied video effect. The selected text line 540 associated with the applied video effect remains in focus. The remaining transcript text 550 displayed on the transcript interface 510 is deemphasized (e.g., faded) so as to focus the attention of a user to the particular text line 540. The wrapped timelines 520, 530 applied on text segments of the text line 540 are also visualized. The visual wrapped timelines 520 are displayed above the text line 540 and are vertically stacked. Each visual wrapped timeline is displayed over the text segment on which it was applied. The audio wrapped timeline 530 is displayed below the text line 540. Using additional techniques described herein, after an interaction modality (e.g., a pointer device hover) with the wrapped timeline 530, the transcript interface 500 visualizes the entire span of the wrapped timeline 530 as it extends beyond the selected text line 540 and into portions of the transcript 510 that are deemphasized. In this example, the wrapped timeline 530 extends to the subsequent text line that is deemphasized. While a pointer device hovers over the wrapped timeline 530, the transcript interface 500 visualizes the entire span of the wrapped timeline 530 even in the deemphasized portions of the transcript.

Figure 6:
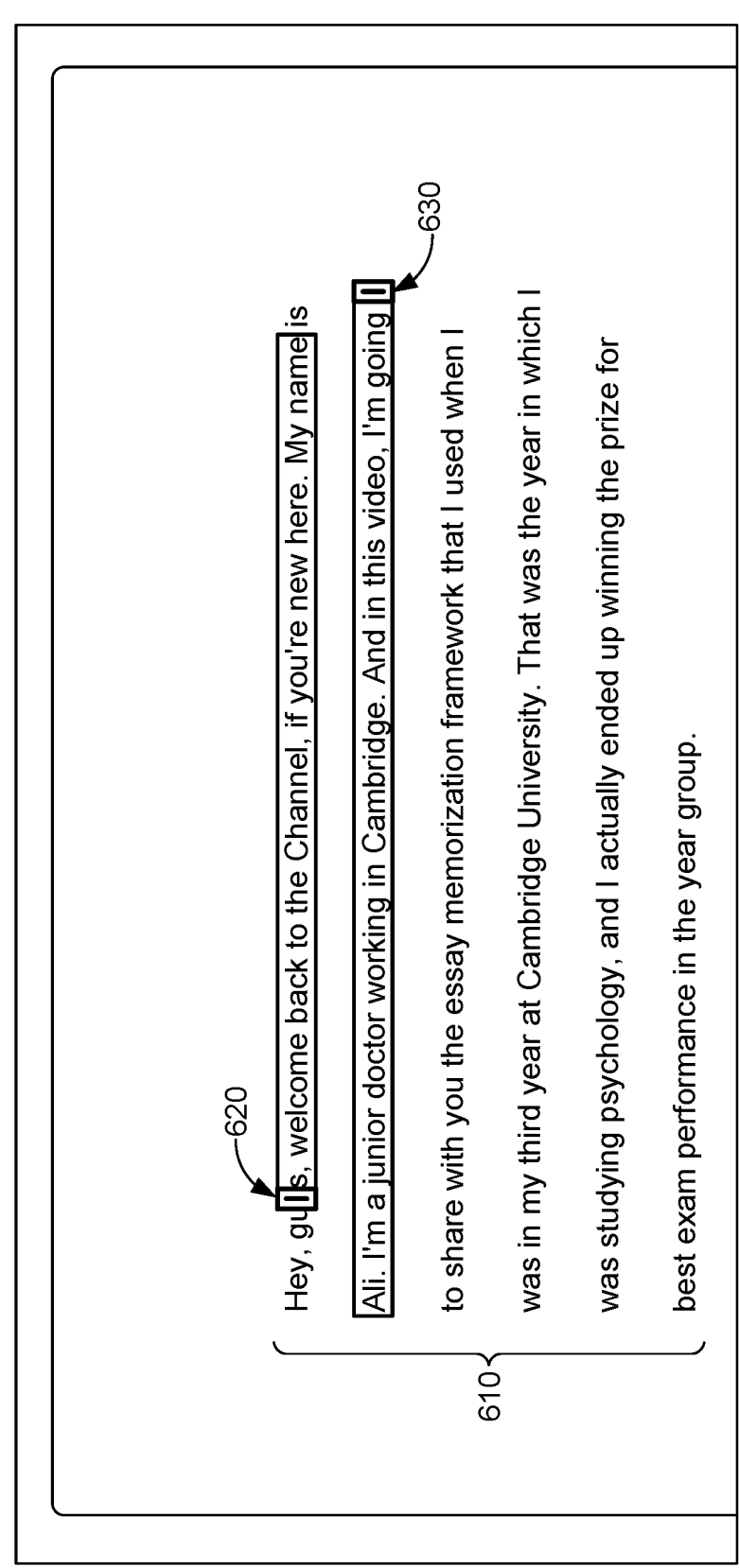
FIG. 6 illustrates an example transcript interface displaying an editing view of a wrapped timeline in a transcript, in accordance with embodiments of the present disclosure.

FIG. 6 illustrates an example transcript interface 600 for text-based video editing, in accordance with embodiments of the present disclosure. In this example, the transcript interface 600 visualizes a transcript 610 with an interaction modality that corresponds to selection of a text segment with an applied video effect. The selection occurs via clicking or tapping the text segment, the corresponding wrapped timeline, icon, or label if present on the transcript interface 600. The highlighted region includes adjustable handles 620 and 630. The left adjustable handle 620 is used to adjust or trim the start of the applied video effect, and the right adjustable handle 630 is used to adjust or trim the end of the applied video effect. As such, the transcript interface 600 uses a text-based selection to highlight a text segment and to define a starting point and ending point using adjustable handles on each end of the highlighted region. In some embodiments, the transcript interface 600 accepts input identifying selection of an adjustable handle, and in response, executes a corresponding visualization mechanism (e.g., lens view), as described in more detail below with respect to FIG. 7.

Figure 7:
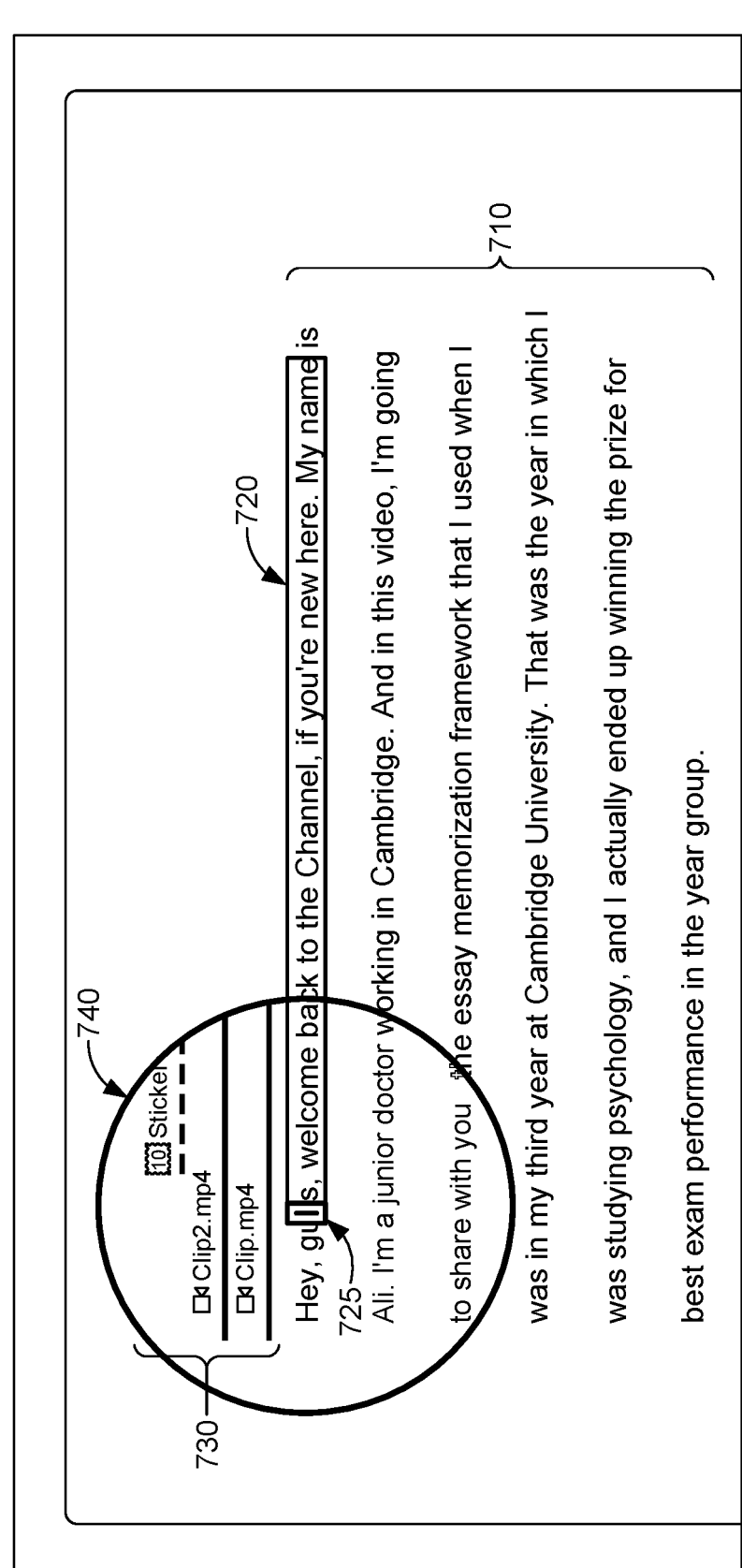
FIG. 7 illustrates an example transcript interface displaying a lens view over a left handle of a wrapped timeline in a transcript, in accordance with embodiments of the present disclosure.

FIG. 7 illustrates an example transcript interface 700 for text-based video editing, in accordance with embodiments of the present disclosure. In this example, the transcript interface 700 presents a visualization of a loaded video's transcript 710, a highlighted text segment 720, an adjustable handle 725, and corresponding wrapped timelines 730 within a viewing lens 740 and as viewed during the editing process of a video. The transcript interface 700 provides a lens view during adjustment, or trimming, of an applied video effect over the highlighted text segment 720 to provide an enhanced visualization of the adjustable handle 725 and surrounding wrapped timelines 730 so that precise adjustment of the selected video effect is performed. In this example, the first wrapped timeline labeled "Sticker" has been selected such that movement of the adjustable handle 725 modifies the start of the visual effect corresponding to that wrapped timeline.

In FIG. 7, transcription of a video has already been performed (e.g., some transcription tool described in FIGS. 1A and 1B) and is presented in the transcript interface 710.

Depending on the embodiment, the transcript interface 700 presents an example wrapped timeline visualization technique depicting a lens view of the transcript interface 710 after an interaction modality (e.g., handle selection) is used to edit a video effect applied on the text segment 720. Upon selection of the adjustable handle 725, the viewing lens 740 is visualized and centered over the handle 725. The text segment 720 associated with the applied video effect is highlighted indicating the location of the applied video effect. Within the viewing lens 740, a portion of the wrapped timelines 730 associated and within a proximity of the selected effect are displayed. In some embodiments, the displayed portion of the wrapped timelines 730 includes icons, labels and a portion of the wrapped timelines 730. In some embodiments, a portion of a displayed wrapped timeline within the viewing lens 740 is relative to the location of the selected handle. In this way, the surrounding video effects are considered when adjusting the selected video effect. For example, when adjusting a selected video effect, a user may want the selected video effect to start at the end of another video effect. Within the viewing lens 740 perspective, a user observes the surrounding video effects as well as the endpoint of those video effects to allow the user to make adjustments based on the surrounding video effects as displayed by the wrapped timelines 730.

Figure 8:
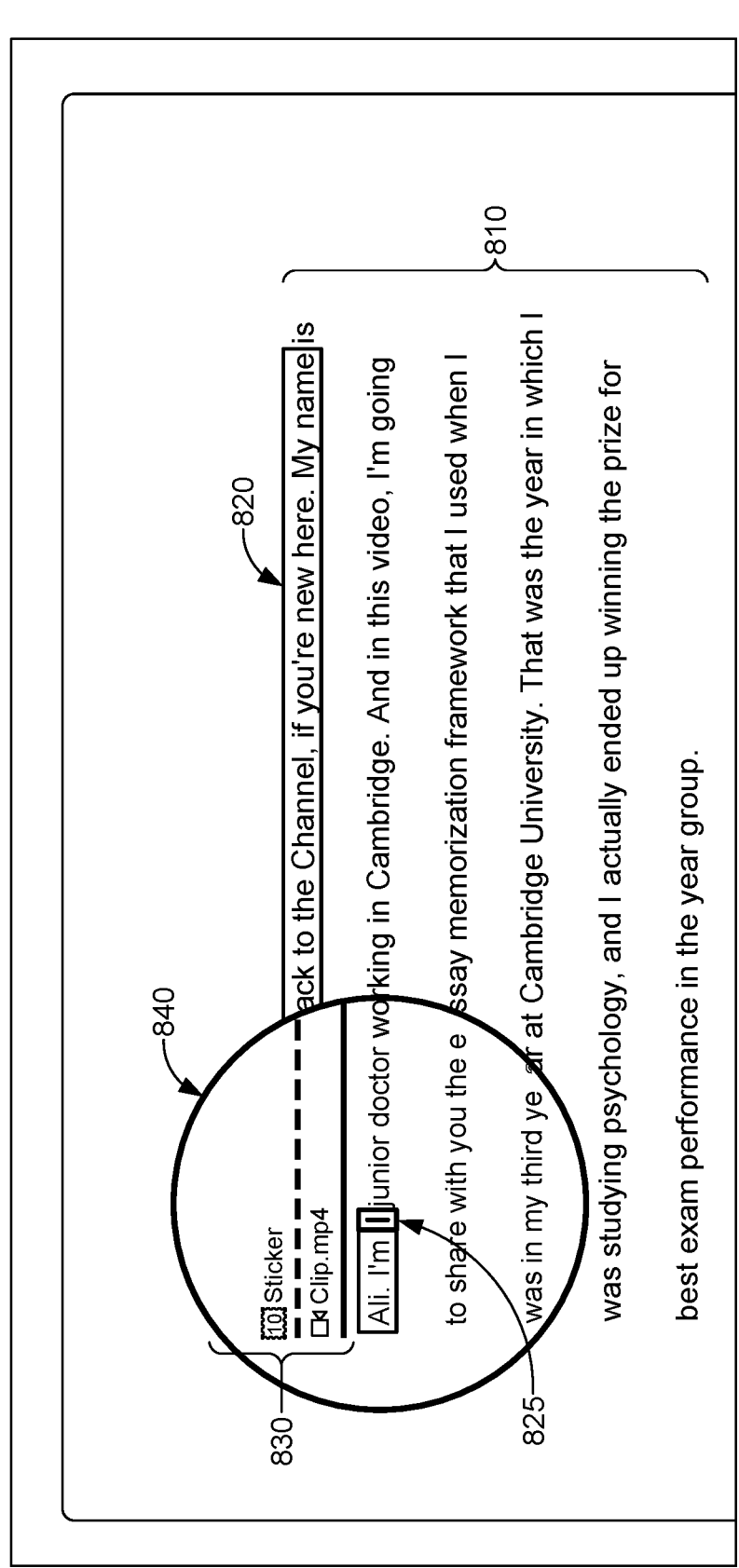
FIG. 8 illustrates an example transcript interface displaying a lens view over a right handle of a wrapped timeline in a transcript, in accordance with embodiments of the present disclosure.

FIG. 8 illustrates an example transcript interface 800 for text-based video editing, in accordance with embodiments of the present disclosure. In this example, the transcript interface 800 presents a visualization of a loaded video's transcript 810, a highlighted text segment 820, an adjustable handle 825, and corresponding wrapped timelines 830 within a viewing lens 840 and as viewed during the editing process of a video. The transcript interface 800 provides a lens view during adjustment, or trimming, of an applied video effect over the highlighted text segment 820 to provide an enhanced visualization of the adjustable handle 825 and surrounding wrapped timelines 830 so that precise adjustment of the selected video effect is performed. In this example, similar to the adjustable handle and viewing lens in FIG. 8, the first wrapped timeline labeled "Sticker" has been selected such that movement of the adjustable handle 825 modifies the end of the visual effect corresponding to that wrapped timeline.

In FIG. 8, transcription of a video has already been performed (e.g., some transcription tool described in FIGS. 1A and 1B) and is presented in the transcript interface 810. Depending on the embodiment, the transcript interface 800 presents an example wrapped timeline visualization technique depicting a lens view of the transcript interface 810 after an interaction modality (e.g., handle selection) is used to edit a video effect applied on the text segment 820. As with FIG. 7, upon selection of the adjustable handle 825, the viewing lens 840 is visualized and centered over the handle 825. However, as shown in FIG. 8, adjustable handle 825 is the right-side handle of the text segment 820. The text segment 820 associated with the applied video effect is highlighted indicating the location of the applied video effect. Within the viewing lens 840, a portion of the wrapped timelines 830 associated and within a proximity of the selected effect are displayed. In some embodiments, the displayed portion of the wrapped timelines 830 includes icons, labels and a portion of the wrapped timelines 830. In some embodiments, a portion of a displayed wrapped timeline within the viewing lens 840 is relative to the location of the selected handle and/or the opposing adjustable handle. In this way, the surrounding video effects are considered when adjusting the selected video effect. Within the viewing lens

840 perspective, a user observes the surrounding video effects as well as the endpoint of those video effects to allow the user to adjust based on the surrounding video effects as displayed by the wrapped timelines 830.

Example Flow Diagrams

Figure 10:
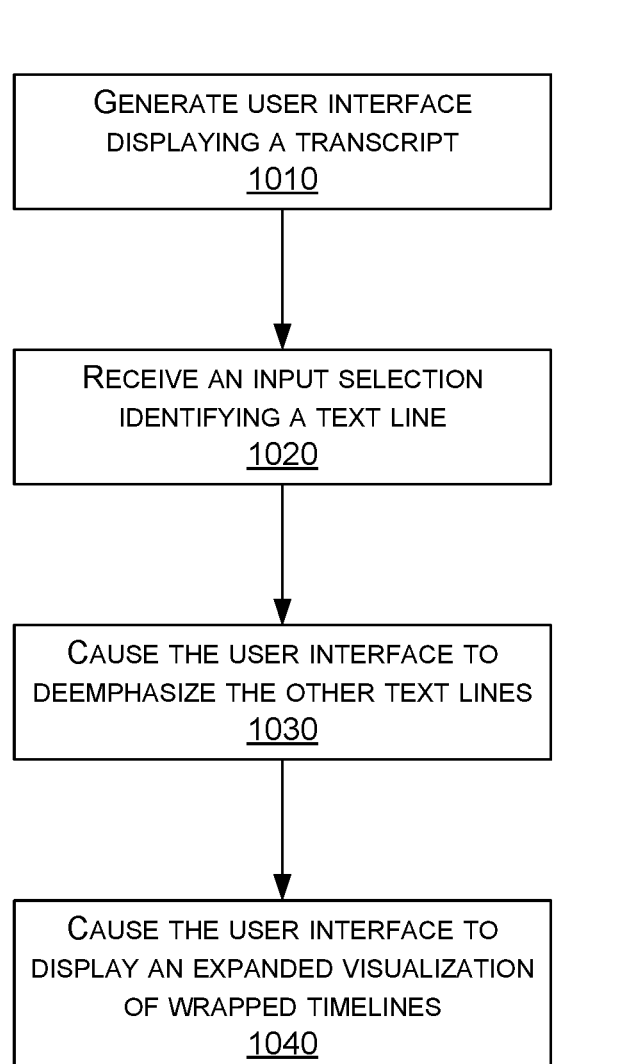
FIG. 10 is a flow diagram showing a method for providing a focused viewing mode of applied video effects on a text line of a transcript, in accordance with embodiments of the present disclosure.
Figure 11:
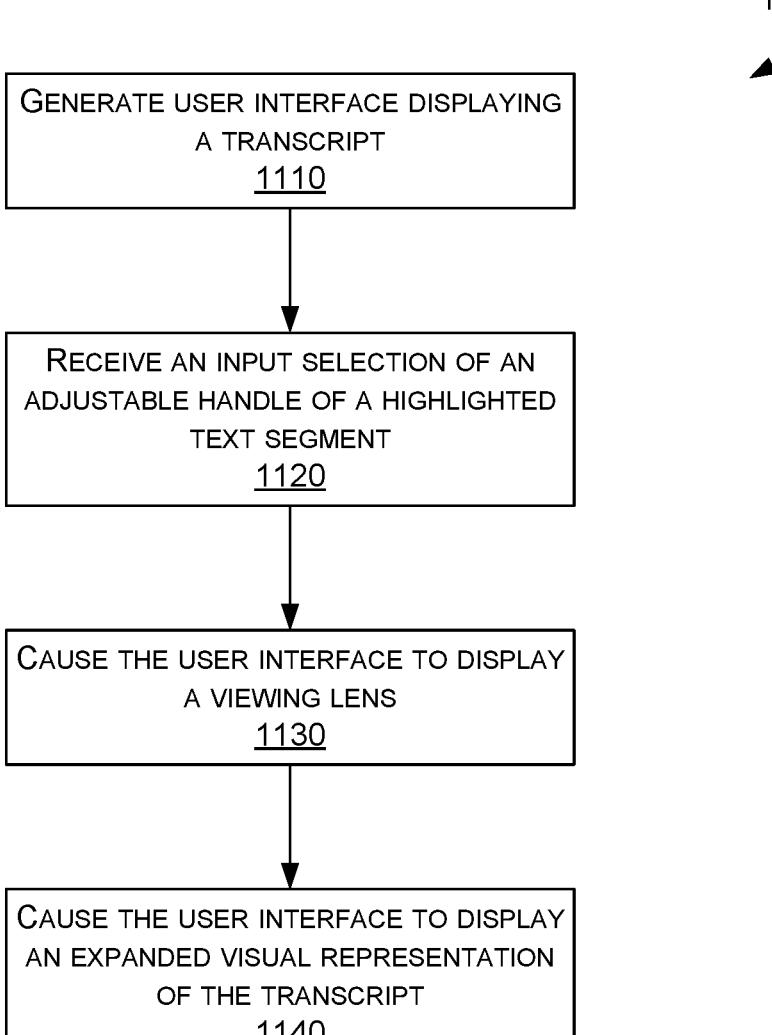
FIG. 11 is a flow diagram showing a method for providing a lens viewing mode of an applied video effect during editing of the video effect, in accordance with embodiments of the present disclosure.

With reference now to FIGS. 9-11, flow diagrams are provided illustrating methods for applying video effects to a video via a transcript and providing visualizations and interaction modalities through wrapped timelines. Each block of the methods 900, 1000, and 1100 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

FIG. 9 is a flow diagram illustrating a process 900 of applying video effects on a transcript of a video, in accordance with embodiments of the present disclosure. The process 900 may be performed by hardware, firmware, software executing on a processor, or a combination thereof. For example, any or all the steps of the process 900 may be performed by one or more processors embedded in a computing device.

FIG. 9 is a flow diagram showing a method 900 for applying video effects to a video via a corresponding transcript and displaying wrapped timelines in a compact viewing mode, in accordance with embodiments of the present disclosure. Initially, at block 910, a video editing application generates a user interface (e.g., transcript interface) displaying a transcript of an audio track of a video. In some embodiments, the transcript is produced during video ingestion where the transcript is extracted from an audio track of the video 912 (e.g., using known techniques) to identify sentences, words, and timecodes representing when each word is spoken in the video 914.

At block 920, the user interface receives an input selection identifying a text segment from the transcript. For example, a user clicks and drags across words on the transcript to select a text segment. The identified boundaries corresponding to the selected text segment are used as boundaries for a corresponding video segment. At block 930, the user interface receives an input selection identifying a video effect (e.g., visual effect, audio effect) for application to the video segment corresponding to the selected text segment. In some embodiments, the user interface includes an effect panel displaying available and selectable video effects for application to the video. In response to receiving the input selection identifying the video effect, at block 940, the video effect is applied to the video segment corresponding to the selected text segment.

At block 950, application of the video effect causes the user interface to display a wrapped timeline in the transcript along the selected text segment. The wrapped timeline represents the selected video effect to provide a visualization in the transcript as to the location and effect type of the applied video effect.

FIG. 10 is a flow diagram showing a method 1000 for providing a enhanced visualization and focused viewing mode when performing video edits using transcript interactions when wrapped timelines are applied onto text segments, in accordance with embodiments of the present disclosure. Initially, at block 1010, a video editing application generates a user interface (e.g., transcript interface) displaying a transcript of an audio track of a video. The transcript includes at least one applied video effect represented on the transcript with a wrapped timeline.

At block 1020, the user interface receives an input selection identifying a text line including a text segment with an applied video effect. For example, a user clicks a pointer over a text line in the transcript or the user clinks a pointer over the wrapped timeline along a text segment. In response to receiving the input selection identifying the text line, at block 1030, the selection causes the user interface to deemphasize (e.g., fadeout, blur, mask, hide) the other text lines being displayed on the user interface while the selected text line remains in focus.

At block 1040, the selection causes the user interface to provide an expanded visual representation of the wrapped timelines in association with the text line. In some embodiments, the expanded visual representation is represented as the wrapped timelines being vertically stacked with the audio effects placed above the text segment and the video wrapped timelines placed below the text segment (or vice versa). Each expanded wrapped timeline can include an icon and/or a label relating to the effect type the wrapped timeline represents. In some embodiments, upon selection of an expanded wrapped timeline, a text segment associated with the selected wrapped timeline remains in focus with the text segment being highlighted and adjustable handles are added to each end of the text segment.

FIG. 11 is a flow diagram showing a method 1100 for providing an enhanced visualization and focused viewing mode when performing video edits using transcript interactions when wrapped timelines are applied onto text segment, in accordance with embodiments of the present disclosure. Initially, at block 1110, a video editing application generates a user interface (e.g., transcript interface) displaying a transcript of an audio track of a video. The transcript includes at least one applied video effect represented on the transcript with a wrapped timeline. A text segment is highlighted indicating an applied video effect on the text segment. Adjustable handles are also displayed on each of the highlighted text segment.

At block 1120, the user interface receives an input selection (e.g., pointer held down) of one of the adjustable handles of the highlighted text segment. In response to the input selection, at block 1130, the user interface displays a viewing lens centered over the selected adjustable handle.

At block 1130, the selection of the adjustable handle causes the user interface to also display wrapped timelines within the viewing lens associated with the text line and within proximity of the selected wrapped timeline. In some embodiments, the displayed wrapped timelines within the viewing lens also display an icon and/or label associated with the wrapped timeline. In some embodiments, the selected adjustable handle is dragged across the transcript to adjust the duration of the corresponding video effect. During adjustment, the viewing lens provides interaction mechanisms that enable users to explore, discover, and/or modify characteristics (e.g., duration, start point, end point, type of video effect) of the applied video effects through interactions with corresponding wrapped timelines (e.g., effect bars) in the transcript and/or corresponding lines of transcript text.

Example Operating Environment

Having described an overview of embodiments of the present invention, an example operating environment in which some embodiments of the present invention are implemented is described below in order to provide a general context for various aspects of the present invention. Referring now to FIG. 12 in particular, an example operating environment for implementing embodiments of the present invention is shown and designated generally as computing device 1200. Computing device 1200 is but one example of a suitable computing environment and is not intended to suggest any limitation as to the scope of use or functionality of the invention. Neither should computing device 1200 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules (e.g., including or referencing routines, programs, objects, components, libraries, classes, variables, data structures, etc.) refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

Figure 12:
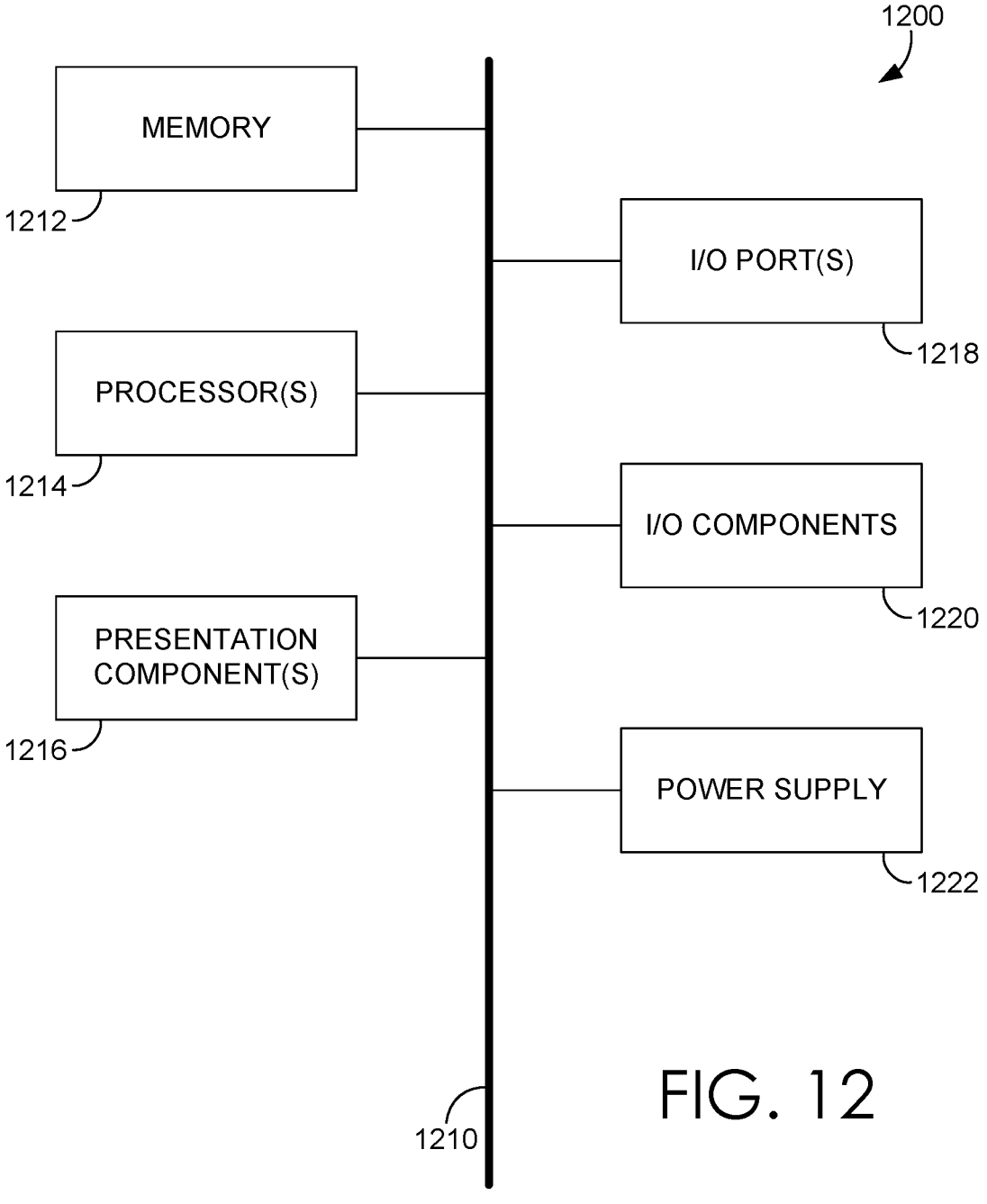
FIG. 12 is a block diagram of an example computing environment suitable for use in implementing embodiments of the present disclosure.

With reference to the example operating environment illustrated in FIG. 12, computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in some cases, it is not possible to delineate clear boundaries for different components. In this case, metaphorically, the lines would be grey and fuzzy. As such, the diagram of FIG. 12 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 12 and a "computing device."

Computing device 1200 typically includes a variety of computer-readable media. Computer-readable media can be any available media that can be accessed by computing device 1200 and includes both volatile and nonvolatile media, and removable and non-removable media. By way of nonlimiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Example presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. The I/O components 1220 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 1200. In some cases, computing device 1200 is equipped with depth cameras, such as stereoscopic camera systems, infrared camera systems, RGB camera systems, touchscreen technology, and combinations of these, for gesture detection and recognition. Additionally or alternatively, the computing device 1200 is equipped with accelerometers or gyroscopes that enable detection of motion, and in some cases, an output of the accelerometers or gyroscopes is provided to the display of computing device 1200 to render immersive augmented reality or virtual reality.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present disclosure is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present disclosure has been described in relation to particular embodiments, which are intended in all respects to be illustrative rather than restrictive. Alternative embodiments will become apparent to those of ordinary skill in the art to which the present disclosure pertains without departing from its scope.

From the foregoing, it will be seen that this disclosure is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when executed by one or more computing devices, cause the one or more computing devices to perform operations comprising:
   generating a user interface (UI) displaying a transcript of an audio track of a video;
   receiving, via the UI, input identifying a displayed text segment from the transcript; and
   in response to receiving, via the UI, input identifying a selected video effect in association with the splayed text segment:
   applying the selected video effect to a video segment corresponding to the displayed text segment;
   causing the UI to display, in the transcript along the displayed text segment, a first wrapped timeline representing the selected video effect to provide a visualization of the selected video effect in the transcript, wherein the selected video effect is a visual effect and the UI displays a second portion of the first wrapped timeline below the displayed text segment and interspersed between corresponding text lines of the displayed text segment; and
   causing the UI to display a focused view of the displayed text segment by expanding the first wrapped timeline in the UI adjacent the displayed text segment in the transcript to multiple timelines to allow interactions with a first portion of the first wrapped timeline, wherein relative positions of the multiple timelines to the displayed text segment indicates where at least the first and a second video effect are being respectively applied.

2. The one or more computer storage media of claim 1, wherein the first wrapped timeline is a visual effect causing the UI to display a second portion of the wrapped timeline below the selected text segment and interspersed between corresponding text lines of the transcript.

3. The one or more computer storage media of claim 1, wherein the first wrapped timeline wraps around multiple text lines in the transcript that correspond to the selected text segment.

4. The one or more computer storage media of claim 1, the operations further comprising: causing the UI to display an icon corresponding to an effect type relating to the selected video effect.

5. The one or more computer storage media of claim 1, the operations further comprising:
   in response to receiving, via the UI, input identifying a third video effect in association with the selected text segment:
   applying the third video effect to the video segment corresponding to the selected text segment; and
   causing the UI to display the third video effect interspersed with the first video effect in text lines of the transcript corresponding to the selected text segment.

6. The one or more computer storage media of claim 1, wherein the first wrapped timeline represents multiple video effects applied to at least a portion of the video corresponding to the selected text segment.

7. The one or more computer storage media of claim 1, wherein the second video effect is a different effect type than the selected video effect.

8. The one or more computer storage media of claim 7, wherein the first wrapped timeline represents one or more visual effects, and the second wrapped timeline represents one or more audio effects.

9. The one or more computer storage media of claim 1, wherein the selected video effect comprises a visual effect, an audio effect, or an invisible effect.

10. The one or more computer storage media of claim 1, wherein the first wrapped timeline includes adjustable handles on each end of the selected text segment allowing modification of the selected video effect.

11. A method comprising:
   generating a user interface (UI) displaying a transcript of an audio track of a video;
   receiving, via the UI, input identifying a selected video effect in association with a displayed text segment that is selected;
   applying the selected video effect to a video segment corresponding to the displayed text segment;
   causing the UI to display, in the transcript along the displayed text segment, a first wrapped timeline representing the selected video effect to provide a visualization of the selected video effect in the transcript, wherein the selected video effect is a visual effect and the UI displays a second portion of the first wrapped timeline below the displayed text segment and interspersed between corresponding text lines of the displayed text segment; and
   causing the UI to display a focused view of the displayed text segment by expanding the first wrapped timeline in the UI adjacent the displayed text segment in the transcript to multiple timelines to allow interactions with a first portion of the first wrapped timeline, wherein relative positions of the multiple timelines to the displayed text segment indicates where at least the first and a second video effect are being respectively applied.

12. The method of claim 11, wherein the first wrapped timeline is a visual effect causing the UI to display a portion of the wrapped timeline below the selected text segment and interspersed between corresponding text lines of the transcript.

13. The method of claim 11, wherein the first wrapped timeline wraps around multiple text lines in the transcript that correspond to the selected text segment.

14. The method of claim 11, further comprising:

receiving, via the UI, input identifying a third video effect in association with a second selected text segment, where are least a portion of the selected text segment and the second selected text segment overlap;

applying the third video effect to the video segment corresponding to the second selected text segment; and causing the UI to associate the first wrapped timeline with the third video effect and interspersing in the transcript displayed in the UI the first video effect and the third video effect corresponding the portion of the selected text segment and the second selected text segment that overlap.

15. The method of claim 11, wherein the first wrapped timeline represents multiple video effects applied to at least a portion of the video corresponding to the selected text segment.

16. The method of claim 11, wherein the second video effect is a different effect type than the selected video effect.

17. The method of claim 16, wherein the first wrapped timeline represents one or more visual effects, and the second wrapped timeline represents one or more audio effects.

18. The method of claim 11, wherein the selected video effect comprises a visual effect, an audio effect, or an invisible effect.

19. The method of claim 11, the UI further comprises a lens view that facilitates fine-tuned adjustments and trimming of the selected video effect through interactions with the first wrapped timeline.

20. A system comprising one or more processors and memory configured to provide computer program instructions to the one or more processors, the computer program instructions comprising:

generating a user interface (UI) displaying a transcript of an audio track of a video, causing the UI to display an unassociated wrapped timeline interspersed between text lines of the transcript, wherein the unassociated wrapped timeline includes a portion that is selectable within the UI;

receiving, via the UI, input identifying a selected video effect in association with a displayed text segment that is selected;

applying the selected video effect to a video segment corresponding to the displayed text segment;

associating the selected video effect along the portion of the unassociated wrapped timeline corresponding to the displayed text segment in the transcript;

causing the UI to display the portion of the unassociated wrapped timeline as a different visualization to provide a visualization of the selected video effect in the transcript, wherein the selected video effect is a visual effect and the UI displays a second portion of the unassociated wrapped timeline below the displayed text segment and interspersed between corresponding text lines of the displayed text segment; and causing the UI to display a focused view of the displayed text segment by expanding the unassociated wrapped timeline in the UI adjacent the displayed text segment in the transcript to multiple timelines to allow interactions with a first portion of the unassociated wrapped timeline, wherein relative positions of the multiple timelines to the displayed text segment indicates where at least the first and a second video effect are being respectively applied.

* * * * *